United States Patent
Ly et al.

(10) Patent No.: US 11,070,426 B2
(45) Date of Patent: Jul. 20, 2021

(54) MECHANISMS FOR THE ADAPTIVE CONTROL OF SERVICE LAYER OPERATIONS

(71) Applicant: CONVIDA WIRELESS, LLC, Wilmington, DE (US)

(72) Inventors: Quang Ly, North Wales, PA (US); William Robert Flynn, IV, Schwenksville, PA (US); Dale N. Seed, Allentown, PA (US); Zhuo Chen, Claymont, DE (US); Michael F. Starsinic, Newtown, PA (US); Rocco Di Girolamo, Laval (CA); Catalina Mihaela Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/959,844

(22) PCT Filed: Jan. 9, 2019

(86) PCT No.: PCT/US2019/012845
§ 371 (c)(1),
(2) Date: Jul. 2, 2020

(87) PCT Pub. No.: WO2019/139947
PCT Pub. Date: Jul. 18, 2019

(65) Prior Publication Data
US 2020/0374193 A1 Nov. 26, 2020

Related U.S. Application Data

(60) Provisional application No. 62/615,043, filed on Jan. 9, 2018.

(51) Int. Cl.
*G06F 15/16* (2006.01)
*H04L 12/24* (2006.01)
(Continued)

(52) U.S. Cl.
CPC ...... *H04L 41/0816* (2013.01); *H04L 41/0886* (2013.01); *H04L 41/5051* (2013.01);
(Continued)

(58) Field of Classification Search
CPC ....... H04L 67/12; H04L 67/322; H04L 67/42; H04L 41/0816; H04L 41/0886; H04L 41/5051; H04L 41/22
(Continued)

(56) References Cited

U.S. PATENT DOCUMENTS 9,628,557 B2 * 4/2017 Gordon ............... G06F 11/1469
10,454,836 B2 * 10/2019 Shaw ................... H04L 41/0806
(Continued)

*Primary Examiner* — Moustafa M Meky
(74) *Attorney, Agent, or Firm* — BakerHostetler

(57) ABSTRACT

Service Layer adaptation may be realized through one or more adaptation rules that are programmed by server administrators in a structured but flexible manner. As part of integrating the adaptive control into its operations, a Service Layer may be configured to provide the capability to receive requests in which an adaptation rule may be specified, to provide indications through response codes returned to requestors that the Service Layer is not able to process a request due to a reduced functional state, and to send a request for more server resources or move an application, a service, or a service instance to another platform.

20 Claims, 12 Drawing Sheets

(51) Int. Cl.
  *H04L 12/26*   (2006.01)
  *H04L 29/08*   (2006.01)
  *H04L 12/66*   (2006.01)
  *H04L 29/06*   (2006.01)

(52) U.S. Cl.
  CPC .............. *H04L 43/08* (2013.01); *H04L 67/12* (2013.01); *H04L 12/66* (2013.01); *H04L 41/22* (2013.01); *H04L 67/322* (2013.01); *H04L 67/42* (2013.01)

(58) Field of Classification Search
  USPC ........................................................ 709/223
  See application file for complete search history.

(56) References Cited

U.S. PATENT DOCUMENTS

| | | | |
|---|---|---|---|
| 2009/0100179 A1* | 4/2009 | Song | G06F 15/16 709/226 |
| 2014/0237070 A1* | 8/2014 | Choi | G06F 3/067 709/216 |
| 2016/0085594 A1 | 3/2016 | Wang et al. | |
| 2017/0126578 A1 | 5/2017 | Kapur et al. | |

* cited by examiner

MECHANISMS FOR THE ADAPTIVE CONTROL OF SERVICE LAYER OPERATIONS

CROSS-REFERENCE TO RELATED APPLICATIONS

This application is the National Stage Application of International Patent Application No. PCT/US2019/012845 filed Jan. 9, 2019, which claims the benefit of U.S. Provisional Patent Application No. 62/615,043 filed Jan. 9, 2018, the contents of which are hereby incorporated by reference in their entirety.

BACKGROUND

In an Internet of Things (IoT) system, a Service Layer provides many capabilities to devices and clients that it communicates with. These capabilities are the services that the Service Layer provides and may include resource discovery, subscription and notification services, device management, retargeting, group operations, semantic queries, etc. In addition, some Service Layers may host resources on behalf of devices and/or clients. The availability of these resources may require additional services such as resource management, authorizations, access control, time series management, event detection, transaction management, interworking, etc. FIG. 1 shows an example of some of the services offered by a Service Layer such as a oneM2M Common Services Entity (CSE).

Each of the aforementioned capabilities may require certain server resources such as CPU utilization, memory, storage, bandwidth, etc. Latency, or the time it takes the server to perform a particular task, may also factor into the overall operations of the Service Layer. Various forms of latency manifest themselves within server operations, from processing a request to sending a response, database access latency, latency between network nodes, etc. The availability of server resources and the amount of concurrent processing may have an impact on the Service Layer's operations.

SUMMARY

Methods and systems are disclosed herein to enable a Service Layer to self-monitor critical Service Layer metrics and adapt its operations in an autonomous manner. The Service Layer adaptation may be realized through one or more adaptation rules that may be programmed by server administrators in a structured but flexible manner. During adaptation, the Service Layer may return new response codes to notify requestors that it is running in a reduced functional state and to offer guidance on when to resubmit a request. Exemplary oneM2M embodiments are disclosed that show how the proposed methods and systems can be utilized in a Service Layer deployment. As part of integrating the adaptive control into its operations, the Service Layer may be configured to perform one or more of the following operations:

Provide the capability to receive requests in which an adaptation rule may be specified. The adaptation rule may include a monitoring component that specifies a comparison of some Service Layer metrics against some set threshold value(s). The adaptation rule may include a command component to adapt certain operations within the Service Layer and optionally for some set duration. One or more adaptation rules may be created to monitor and adapt Service Layer operations;

Provide indications through response codes returned to requestors that the Service Layer was not able to process a request due to a reduced functional state. The reduced functional state may have been a result of the execution of one or more adaptation rules. The response may include additional information to adapt the operations of the requestor, for example to resend a request at a later time; and Send a request for more server resources or to move an application, a service, or a service instance to another platform. The request may include other information such as the conditions that caused the request, the duration the server resources are needed for, the latency requirements that were not met, etc. The request may be sent to a Management and Orchestration (MANO) System.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

Service layer operations may be limited by available server resources and processing latencies. Service Layer (SL) group operations may require a large allocation of memory to process the many parallel requests if the number of group members are large. The latency of a request may be dependent on an external device or client's response to a retargeted request. Other requests may simply entail retrieving a resource from the Service Layer without having dependencies on external entities or needing an abundance of server resources. These requests may require minimal server resources as well as minimal processing latencies. A Service Layer may have finite resources with which to allocate to its many capabilities and may incur different processing latencies that depend on the SL services offered.

Service Layers may need to be readily available and be run in a somewhat autonomous manner without much intervention from a system administrator. The Service Layers may also need to process a large number of simultaneous requests from devices and clients. Some requests may also be time critical and a prompt response may be required for the intended application. As a result, robust operations of a Service Layer are paramount in enabling the IoT system to operate efficiently and without interruptions.

Within oneM2M specifications, both Device Configuration Function (DCF) and Device Diagnostic and Monitoring Function (DDMF) may provide a CSE with some monitoring capabilities (see oneM2M TS-0001, Functional Architecture, V3.7.0). These capabilities are mostly device centric that the CSE manages and focus only on configuring the device and providing a status of the device. The capabilities, however, do not address using the provided metrics to adapt the operations of the CSE.

Figure 1:
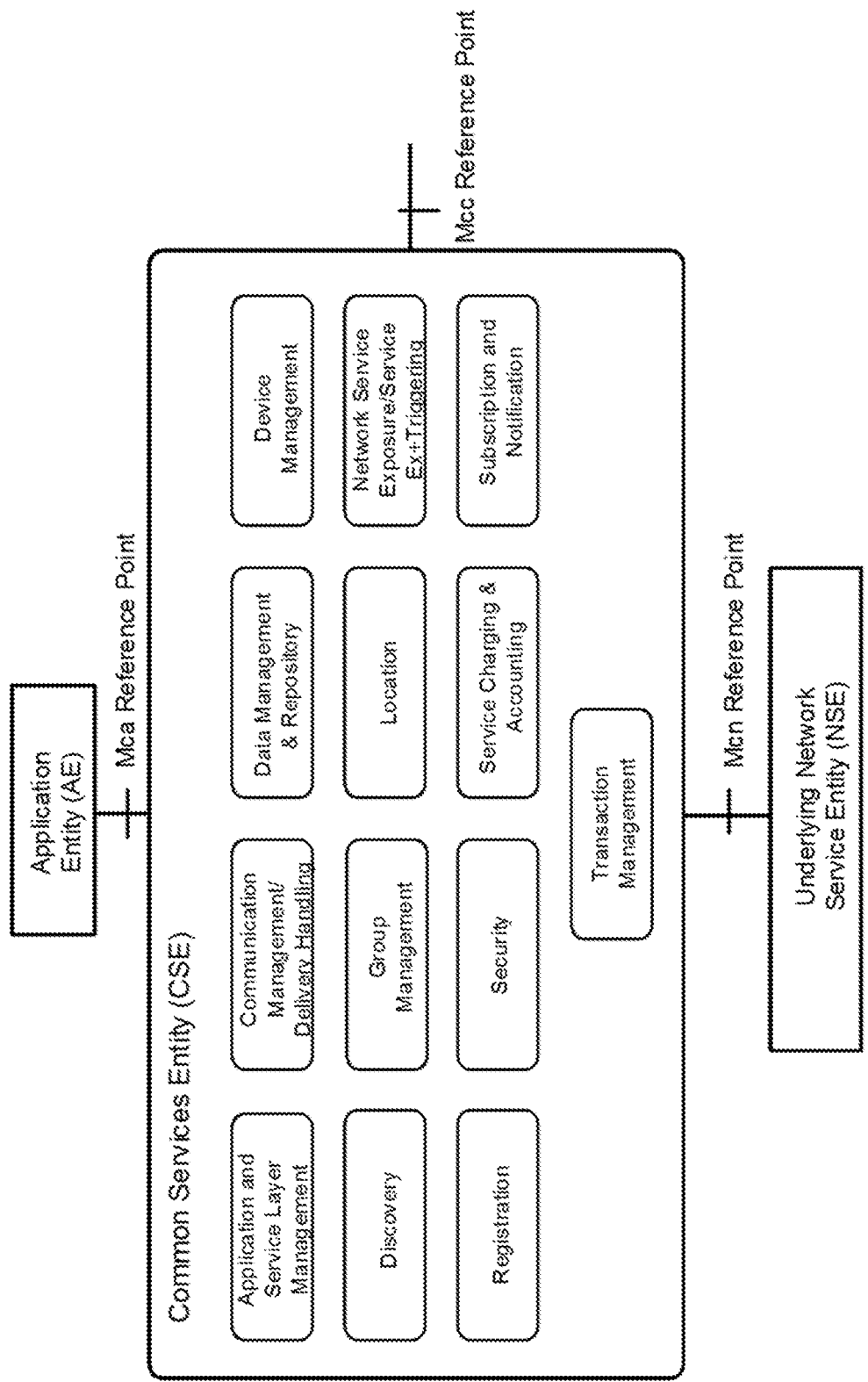
FIG. 1 shows a block diagram of example services offered by a service layer server.
Figure 2:
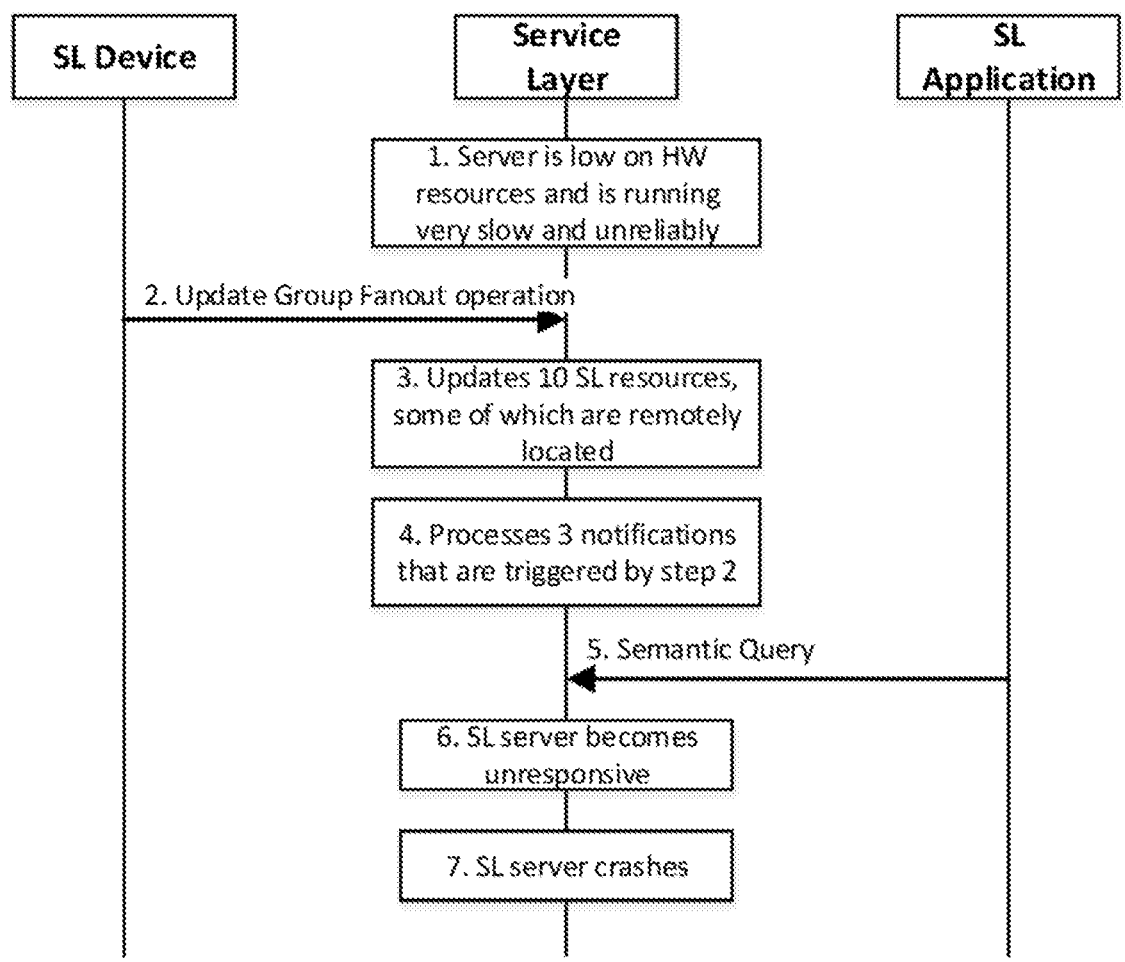
FIG. 2 shows a flow chart of an example service layer server crash.

FIG. 2 shows an example of a Service Layer's operation in which requests from two entities may cause the server to crash. As shown in step 1, the Service Layer may already be exhibiting issues with its operations as it was running slowly and unreliably. This can be an indication that the Service Layer is overloaded and is running low on server resources. As shown in step 2, a SL device performs a group fanout operation to update ten SL resources that are members of the group. As the individual fanout operations are being processed in step 3, three subscriptions are triggered in step 4 and notifications are generated and sent to the respective recipients. As shown in step 5, a new request is received in which a SL application wants to perform semantic query. This new request and the pending group request coupled with the overloaded conditions of the Service Layer cause the server to become unresponsive as shown in step 6, and finally, to crash in step 7. It should be appreciated that this is one of many scenarios that could cause the SL to become unresponsive and to crash. It should also be appreciated that the SL Application and SL Device shown in FIG. 2 could both be SL Applications or both be SL Devices. It should also be appreciated that the problem might not be as severe as the server becoming unresponsive and crashing. The problem might be that the SL determines that it is overloaded and may thus not accept new requests, reject new requests, or service requests in a manner that is not timely.

The example of FIG. 2 highlights a common issue with all server operations, not just with Service Layers. The main solutions may be to increase the hardware resources available to the server so the crash can be avoided. Other solutions may involve installing monitoring software to alert server administrators to take precautionary steps of avoiding overloading the server by performing proper maintenance. These solutions do address server crashes but they involve adding extra hardware which incurs cost and the need for server administrators to review monitoring reports and take preventative measures if necessary.

A Service Layer has well defined services that it offers to devices and applications that it communicates with. These services each have varying requirements of hardware resources and processing latencies. Some services are simple and may require a small amount of memory from the server and an access to a database. Other services may be more involved and require a larger amount of memory, may involve processing multiple requests, and may involve processing requests that need to be routed to remote entities outside of the control of the Service Layer. As such, these services may incur a larger loading on the Service Layer and may even cause a crash of the Service Layer if the server was already overloaded to begin with.

If mechanisms were available to the Service Layer to not only monitor its operations but also to adapt its operations based on the monitored metrics, the Service Layer may be able to prolong its operational state and potentially avoid server crashes. These mechanisms can temporarily suspend certain SL services from operating to prevent overloading the server and enable the Service Layer to operate in an autonomous manner. Another benefit of the mechanisms is the extended operational state of the Service Layer which allows server administrators time to either perform server maintenance or upgrade to prevent server crashes.

The methods and systems disclosed herein may enable the Service Layer to self-monitor critical SL metrics and adapt its operations in an autonomous manner. The Service Layer adaptation may be realized through one or more adaptation rules that may be programmed by server administrators in a structured but flexible manner. During adaptation, the Service Layer may return new response codes to notify requestors that it is running in a reduced functional state and to offer guidance on when to resubmit a request. Exemplary oneM2M embodiments are disclosed that show how the proposed methods and systems can be utilized in a Service Layer deployment.

As part of integrating the adaptive control into its operations, the Service Layer may be configured to perform one or more of the following operations:

Provide the capability to receive requests in which an adaptation rule may be specified. The adaptation rule may include a monitoring component that specifies a comparison of some Service Layer metrics against some set threshold value(s). Furthermore, the adaptation rule may include a command component to adapt certain operations within the Service Layer and optionally for some set duration. One or more adaptation rules may be created to monitor and adapt Service Layer operations;

Provide indications through response codes returned to requestors that the Service Layer was not able to process a request due to a reduced functional state. The reduced functional state may have been a result of the execution of one or more adaptation rules. The response may include additional information to adapt the operations of the requestor, for example to resend a request at a later time; and Send a request for more server resources or to move an application, a service, or a service instance to another platform. The request may include other information such as the conditions that caused the request, the duration the server resources are needed for, the latency requirements that were not met, etc. In one embodiment, the request may be sent to a Management and Orchestration (MANO) System.

Adaptive control methods of Service Layer operations are disclosed herein. For example, a new SL resource is proposed in which the server's operational metrics are exposed to server administrators and authorized users. This resource may provide real-time statistics of metrics that describe the health of a Service Layer. Examples of these metrics will be provided, such as CPU utilization, available memory, used memory, processing latencies, etc.

In addition, a mechanism is proposed in which server administrators or authorized users are able to control the operations of the Service Layer based on the provided operational metrics or user provided priority levels. Control in this case refers to the suspension, delay, resumption, disablement, or enablement of particular SL services or operations. This mechanism may be realized as one or more SL resource(s) created by server administrators or authorized users to control the operations of the Service Layer based on the operational metrics. The mechanism will propose introducing categories of service types, resource levels, and user priorities. Other categories may also be added to provide for more granular control of the Service Layer. The server administrator or authorized user may then configure the new resource(s) using the categories of services, resource levels and priorities to either suspend, delay, resume, disable, or enable services for certain time durations to minimize the possibility of the Service Layer crashing.

Finally, with SL adaptation mechanisms activated, new response messages are proposed to communicate to requestors that the Service Layer is in a reduced functional state. These messages may provide indications that the request was validated but the Service Layer is not able to process it due to a service or operation being temporarily unavailable. The messages can also inform the requestor to try back at a later time in order to obtain the desired service. If enough server resources are available, the Service Layer may even queue the request for future processing.

In addition to or as an alternative to new response messages, the Service Layer may interface to a Management and Orchestration system to request for more server resources. This request may indicate the amount of server resources required to process the request, a set duration in which the server resources are needed, and possibly the migration of applications or services to another platform.

Using the methods and systems disclosed herein, robust operations of a Service Layer may be made available as much as possible and the chance that the Service Layer overloads and crashes may be minimized. These mechanisms may enable the Service Layer to operate in an autonomous manner by adapting to changes in server conditions. Note that server in this case may refer to a cloud server, a gateway, or a device running a service layer. By prolonging the operational state of the Service Layer, server administrators and authorized users may have more time to address the issues affecting the server and users. For example, other service layers and applications may be less likely to experience operational issues. While the methods and systems disclosed are focused on oneM2M Service Layer operations, they may also apply to other SL architectures as well.

In order to provide for the adaptive control of a Service Layer, some metrics may need to be available to provide insight into the operational behavior of the server. Table 1 shows some example metrics for a Service Layer. These metrics may be provided by the Service Layer or by some external process that monitors the server resources.

TABLE 1

Examples of Service Layer Metrics

| Operational Metric | Description | Example Value |
|---|---|---|
| SL CPU Utilization | Percentage of available CPU utilization that is currently utilized by the Service Layer | 90% |
| SL Memory Utilization | Percentage of available memory that is currently utilized by the Service Layer | 95% |
| SL Storage Utilization | Percentage of available storage that is currently utilized by the Service Layer | 73% |
| SL Disk IO Utilization | Percentage of time a disk is in use to service a SL request | 50% |
| Resource Discovery Latency | The time it takes to perform resource discovery - can be specified as typical, minimum, and/or maximum time. | 500 ms |
| Semantic Query Latency | The time it takes to perform semantic query - can be specified as typical, minimum, and/or maximum time over a certain measurement period. | 1500 ms |
| Database Read Latency | The time it takes to read the database (for Retrieve operations) - can be specified as typical, minimum, and/or maximum time over a certain measurement period. | 5 ms |
| Database Write Latency | The time it takes to write to the database (for Create, Update, Delete operations) - can be specified as typical, minimum, and/or maximum time over a certain measurement period. | 15 ms |
| Request Processing Latency | The time it takes to process a SL request - can be specified as typical, minimum, and/or maximum time over a certain measurement period. | 150 ms |
| SL Throughput | The number of requests received by the Service Layer per second - can be specified as typical, minimum, and/or maximum time over a certain measurement period. | 322 |
| SL Error Rate | The percentage rate Service Layer returns an error code indicating it was a server error | 0.2 |
| Number of Pending Requests | Number of pending SL requests in the processing queue | 32 |
| Number of Subscriptions | Number of subscription resources | 1057 |
| Notification Rate | Percentage rate of sending notifications as compared to all messages sent by the Service Layer | 7% |

The operational metrics listed in Table 1 can be realized as a SL resource with a list of associated attributes to correspond to the metrics listed. The resource may be owned by the Service Layer and accessed by server administrators or authorized users. Each metric may provide real-time status of the underlying measurement or calculation pertaining to the operations of the Service Layer over a period of time. In addition to the real-time values, maximum and minimum values may also be presented for use in comparing current server operations to the best and worst case operational metrics during the server's lifetime. Additional details may be provided with each metric, for example, a parameter that expresses the latency of an operation could also provide additional details about the query (who requested it, the query details, etc.). It should also be appreciated that this resource might be hosted by a different service layer. For example, a gateway service layer may create, or announce, this resource to an M2M Server so that applications or services on the M2M server can monitor the resource utilization of the gateway. These comparisons may then be used to adaptively control SL services as described in the next section.

In order for the adaptive control to function, SL services that can be controlled may need to be defined. These definitions may be grouped together as service types that are organized into levels from critical to optional services. Some SL services, however, may be required in order for the Service Layer to operate and hence may not be included in the service type levels that may be disabled. Examples of these services may be Retrieve/Update/Delete of existing SL resources, security services, authorization and access control checks, etc.

The grouping of the SL services may depend on the impact the services have on the server's operations. Factors such as server resource requirements including CPU and memory usage, database accesses, remote operations, processing latencies, etc. can help server administrators and authorized users make a determination on which service type level each service is grouped into. Table 2 lists examples of some SL service types that can be defined and made available for adaptive control.

TABLE 2

Examples of SL Service Types

| Service Type Levels | Services |
|---|---|
| ST1 | Backup service, access control creation check |
| ST2 | Device management, attribute value check |
| ST3 | Retargeting, resource discovery, notifications, long polling, archive retrieval |
| ST4 | Location, interworking, transaction, dynamic authorization, event management, announcements, remote operations |
| ST5 | Communications management and delivery handling (CMDH), time series data, multicast, group fanout, semantic query |

The example service types presented in Table 2 are grouped into five levels. However, more levels may be added to provide for more granular control of the variety of services offered by a Service Layer. These levels are organized by the criticality of the services to the server's operations, with the more critical services listed first and therefore may be disabled last. More advanced, but optional, features may be grouped as less critical as are services that consume a lot of server resources. The grouping of these services may also change over time as server administrators and authorized users may find the need to increase or decrease the level of a service depending on the requirements of users.

In addition to SL services, create or execute operations on certain SL resources may also impact server operations. Sometimes, a request on a resource may require certain services to operate, such as a request on the oneM2M fanout resource triggers group operations within the Service Layer. Other times, a request to create certain resources may involve triggering a SL service at some later instance in time. For example, creating a subscription resource may trigger notifications in the future. Similarly, creating an application resource may require future operations on one or more container, subscription, and/or contentInstance resources. Some requests on a resource may merely impact operations within the server that the SL can manage, such as creating a oneM2M contentInstance resource, which requires mainly a database access. The grouping of SL resources provides for a secondary level of adaptive control in which create or execute operations toward certain resources may be disabled should the SL be limited in server resources. Table 3 shows some examples of how oneM2M resources may be grouped to provide for more granular and adaptive control of Service Layer operations.

TABLE 3

Examples of SL (oneM2M) Resource Levels

| Resource Levels | Services |
|---|---|
| RL1 | Access control policy, contentInstances |
| RL2 | Containers, flexContainers, node, mgmtObj, mgmtCmd, execInstance |
| RL3 | Subscription, notification, schedule, request, archive resource |
| RL4 | AE, group, locationPolicy, delivery, pollingChannel, statsConfig, eventsConfig, statsCollect |

As shown in Table 3 and similar to SL services, SL resources may be grouped into levels for use in the adaptive control of the server's operations. The levels may be organized in a similar fashion as SL services, where the most critical SL resources are listed first and have a lower resource level. These resources, such as oneM2M's ACP and contentInstance resources, may also have minimal impacts to the operations of the Service Layer. Other resources, such as oneM2M's AE and group resources, may require more server resources. In the case of an AE resource, creating the resource has minimal impact at the time of creation but the impact may be realized in the future as the AE may then be able to create one or more containers, subscriptions, and even group resources. If a SL is already low on server resources, the best course of action may be to limit the number of users (or AEs) from accessing SL services. By denying an AE's request, the Service Layer may be able to focus on servicing AEs already created on the server.

Both the service type levels and SL resource levels provide for two sets of operational components used in adapting the Service Layer's operations. However, these components focus on only two aspects of the Service Layer—services and resources. A third aspect may be realized to account for cases in which certain requestors may have more urgent needs than others. For example, a requestor may have a more urgent need to get notifications, such as if the requestor is a doctor who is monitoring a patient in critical condition at a hospital. On the other hand, a sensor device may have been recently upgraded to provide a new measurement in which a container resource needs to be created. In this case, if resource level 3 from Table 3 is disabled, the doctor may not be able to receive notifications, while the sensor may be able to create the container for the new measurement. This third aspect accounts for the Service Layer to process user priority levels. Having a third operational component can provide for even more granular control of operations in such cases. As needs arise, even more components may be added and what these components are may be deployment or server specific. In addition to user priority, other components may be based on the importance of the data that is associated with the operation, the security that is required for the data that is associated with the operation, and how much time has passed since the data that is associated with the operation was updated or accessed.

Using the operational components set forth in the preceding tables, a structured expression may be crafted to form the basis for adapting control of a Service Layer. This expression, herein referred to as adaptation rules, may have a monitoring component and a control component and have the form:

If(metric)(operator)(threshold)(time window),
→monitoring (command)[server operations] for(duration)→control where:

| | |
|---|---|
| metric | Service Layer metric being monitored, examples in Table 1 |
| operator | Relational operators such as >, <, =, >=, <=, !=, etc. |
| threshold | A value associated with the Service Layer metric |
| time window | A parameter where a time window may be added to indicate when the monitoring is enabled; outside the time window, no monitoring is performed |
| command | Adaptive command such as enable, disable, suspend, resume, etc. |
| server operations | The server operations that are being controlled, such as the service types from Table 2, the resource levels of Table 3, and user priority levels, e.g. levels 1 to 10. This parameter may contain a list of operations or services of the Service Layer. |
| duration | A duration usually specified in time units the adaptive control is applied to the server's operations. The duration may also be specified as a conditional expression in which certain metrics must meet a certain threshold value in order for the adaptive control to be removed, e.g. serverMetric < thresholdValue. |

The monitoring component of the adaptation rule may comprise comparisons of the current value of a metric against threshold values determined to cause issues with the operations of the Service Layer. Additionally or alternatively, the current value may be compared against either the minimum or maximum value for that metric. An optional time window may be added to limit when the comparison is performed—within the window, monitoring is enabled; outside the window, no monitoring is performed. The threshold value may be updated to provide flexibility in creating the comparisons. For example, at initial deployment of a Service Layer, a server administrator may configure an initial threshold that is aggressive for a particular metric to ensure the server can support as many users as possible. If and when the performance of the server is impacted by an abundance of users later, the administrator may need to decrease the threshold value to prevent the possibility of a server crash. Decreasing the threshold value also affords server administrators advance warnings with which they may have more time to address any potential issues with the server's operations.

The control component describes what may need to be performed to adapt the Service Layer's operations and for what time duration, if any. The "(command)" parameter is a command that determines what operational behavior to take in response to the metric exceeding the threshold value. This command may be to disable, delay, suspend, resume, or enable particular operations of the Service Layer. The "[server operation]" parameter indicates the services and/or operations that are affected by the command. This parameter may have multiple references to different server operations that will be described later. Finally, the optional "(duration)" parameter determines the time duration the command takes effect in controlling the operations of the server. This parameter may be specified as a set time duration, as a null value to signify an infinite period, or as an operational metric that controls the duration of the adaptation.

The "[server operations]" may be divided further as a sub-expression in which the different operational components are factored into the full expression. For example, "disable [ST3, not RL3, (UPL>5)]" may be interpreted as disable all the services listed in ST3 (and above) but not for creating resources in level 3 (and below) and only for user priority levels (UPL) greater than 5. In other words, all services at ST3 level and above (ST3 to ST5) and all requests with a UPL greater than 5 (UPLs 6 to 10) are disabled but creating resources in RL3 levels and below (RL1 to RL3) are allowed. Note the composition and interpretation of the sub-expression for server operations may be implementation dependent as the operational components of servers may be different from each other.

The user priority levels (UPL) are levels that may be assigned by the Service Layer for all requestors in the system. These priority levels may be specified within a range, such as 1 to 10 with one being the highest priority, and sub-ranges may be assigned to each individual requestor, e.g. 7 to 10. The UPL may be assigned as a policy during the onboarding process of a device, during the device's registration procedure, or some other service subscription mechanism. The policy may be finely grained in which services and resources are assigned priority levels. Additionally or alternatively, it may be unconstrained and only indicate a range of priority levels in which the requestor may use in making requests.

When combined together, the full expression describes conditions in the Service Layer such that when it is detected, some operations of the server are affected, possibly for a set duration. The monitoring component of the expression may detect the server condition that is of interest. When the condition triggers, the control component may determine what needs to be performed. For example, a particular service or operation may be suspended. Finally, if a duration is specified, the suspended service may resume operations after the set duration has elapsed.

The entire expression, therefore, may form the adaptation rules server administrators or authorized users may use to configure how the SL adapts to changes in the utilization of SL resources. These rules may be configured to monitor the operational metrics of the Service Layer and adapt control of the SL's operations by either disabling or suspending services or enabling or resuming services as necessary. The operations of the Service Layer can then adapt to changes in server resources so as to avoid sluggish operations or even a server crash. This adaptation may ensure the Service Layer is available but with a reduced functional scope.

The adaptation rules can be created individually and at different times depending on the needs of the Service Layer. As the server administrators or authorized users learn the behaviors of the server under certain conditions, more rules may be added. Collectively, the rules may then monitor all aspects of the SL's operations and adapt the operations of the SL services as specified. The adaptation rules may be realized as a resource within the Service Layer to allow server administrators and authorized users the ability to configure and update the rules to dynamically control server operations.

Example methods for how the service layer might respond to requests from other service layers and applications during SL adaptation, which is the reduced functional state of the Service Layer, are described below.

With the ability to adapt operations of the Service Layer in place, a mechanism may be added to inform requestors that certain services or operations are temporarily unavailable and if possible, indicate a time the service or operation may be made available in the future. This mechanism is important to distinguish the case in which a service is not available at all (when the Service Layer does not support a particular service) to the case in which the Service Layer does support a service but has temporarily suspended its operations. Table 4 shows some example response codes a Service Layer may include in a response message to provide an indication of its reduced functional state.

TABLE 4

Examples of New SL Response Codes

| New Response Code | Description |
| --- | --- |
| SERVICE_TEMPORARY_UNAVAILABLE | The required service is temporarily unavailable, try again later. The request was validated but the server cannot process the request at this time. If possible, a time may be provided to indicate when the service will be available. |
| REQUEST_CANNOT_BE_PROCESS | The Service Layer is in a reduced functional state and cannot process the current request. The request was validated but the server cannot process the request at this time. The reason may be indicated by a resource level (RL) or a user priority level (UPL) that are temporarily unavailable. Additional information about why the request may not be processed may also be included. If possible, a time may be provided to indicate when the request may be able to be processed. |
| REQUEST_QUEUED_RESPONSE_LATER | The request has been validated and queued by the Service Layer and will be processed at a later time when the appropriate service is available. A temporary ID may be provided in the response so the requestor can perform request-response matching. Alternatively, a URI may be provided to indicate where the response may be stored within the Service Layer. If possible, a time may be provided to indicate when the response or another status update may be returned. |
| ACCESS_DENIED_PRIORITY_LEVEL | If a UPL is provided by the requestor and the value is outside the range of the adapted value, the SL returns this error. This error is also returned for cases in which a policy is configured for user priority levels of the requestor that is outside the range of the current adapted UPL. |
| SERVER_BUSY_TRY_AGAIN | The Service Layer is in a very limited operational state and cannot process the request at this time, try again later. No validation of the request is performed. If possible, a time may be provided to indicate when the Service Layer may be available again. |

Each of the response codes listed in Table 4 may be used whenever a Service Layer adaptation is in effect and the required service or function is not available. In other words, the response codes in Table 4 may be triggered by the activation of one or more adaptation rules. During normal operations without any adaptation, these response codes may not be used as the services required are available to process the request.

The response code returned depends on the state of the Service Layer when the request is being processed. The state of the Service Layer is determined by executing one or more adaptation rules. The response code SERVICE_TEMPORARY_UNAVAILABLE may be returned when a particular service that is required to process the request has been disabled or suspended and is currently not available. If the adaptation rule that disabled or suspended the service provided a time duration, then that time duration can be included with the response code to indicate when to retry the request. As stated before, this response code may be used to differentiate from the case in which the service is not implemented by the Service Layer.

The response code REQUEST_CANNOT_BE_PROCESS may be used whenever an adaptation rule has specified that either a resource level (RL) or other SL operational component has been suspended. This response code may indicate the Service Layer is in a reduced functional state and cannot process the request. If a time duration was specified in the adaptation rule, that value may be included in the response as well. Finally, the response message may also include information on what prevented the Service Layer from processing the request.

In cases where the Service Layer is able to queue up the request but is not able to process it until a later time, the response code REQUEST_QUEUED_RESPONSE_LATER may be returned to the requestor. A temporary ID may be returned with the response code for use in request-response matching. In one embodiment, the ID may be a URI that specifies where the response will be stored in the Service Layer for later retrieval. If the Service Layer has information on when the response may be returned, that information may be added to the response message. When the Service Layer is ready to send the response, the temporary ID may be included so the requestor can identify that this response is for a previous request.

For cases where the ACCESS_DENIED_PRIORITY_LEVEL response is returned, the Service Layer may be indicating that the request is not able to be processed due to having insufficient user priority levels for the request. The user priority levels may be retrieved from a policy that was assigned by the Service Layer as previously described or specified explicitly in the request. Either way, the priority level provided or retrieved may be outside the range of the currently adapted priority level that the Service Layer is operating with.

The SERVER_BUSY_TRY_AGAIN response code may be returned in cases where the Service Layer is in a very limited operational state and cannot process the request. This response code may reflect an extreme state of the operations of the Service Layer that the request is not even validated. The response code may indicate an imminent need for server administrators to address the issues with the Service Layer before the server crashes. For example, this response code may be returned if Service Layer operations are limited to ST1 from Table 2 and RL1 from Table 3. Notifications may also be automatically generated and sent to server administrators to indicate the severity of the issue with the Service Layer.

Examples for how the proposed methods and systems are used through procedural interactions with the Service Layer are described below. At deployment, a Service Layer may have exposed the operational metrics of the server as a resource. Adaptation rules may then be created using the metrics and the service types and resource levels shown in Table 2 and Table 3, respectively. In addition, user priority levels 1 to 10 are available for assigning to user requests. The Service Layer may assign these UPLs based upon information in a requestor's service profile. Alternatively, a requestor may be assigned a range of UPLs with which to make requests with and may use different RPLs dependent on the need of a particular request.

Figure 3:
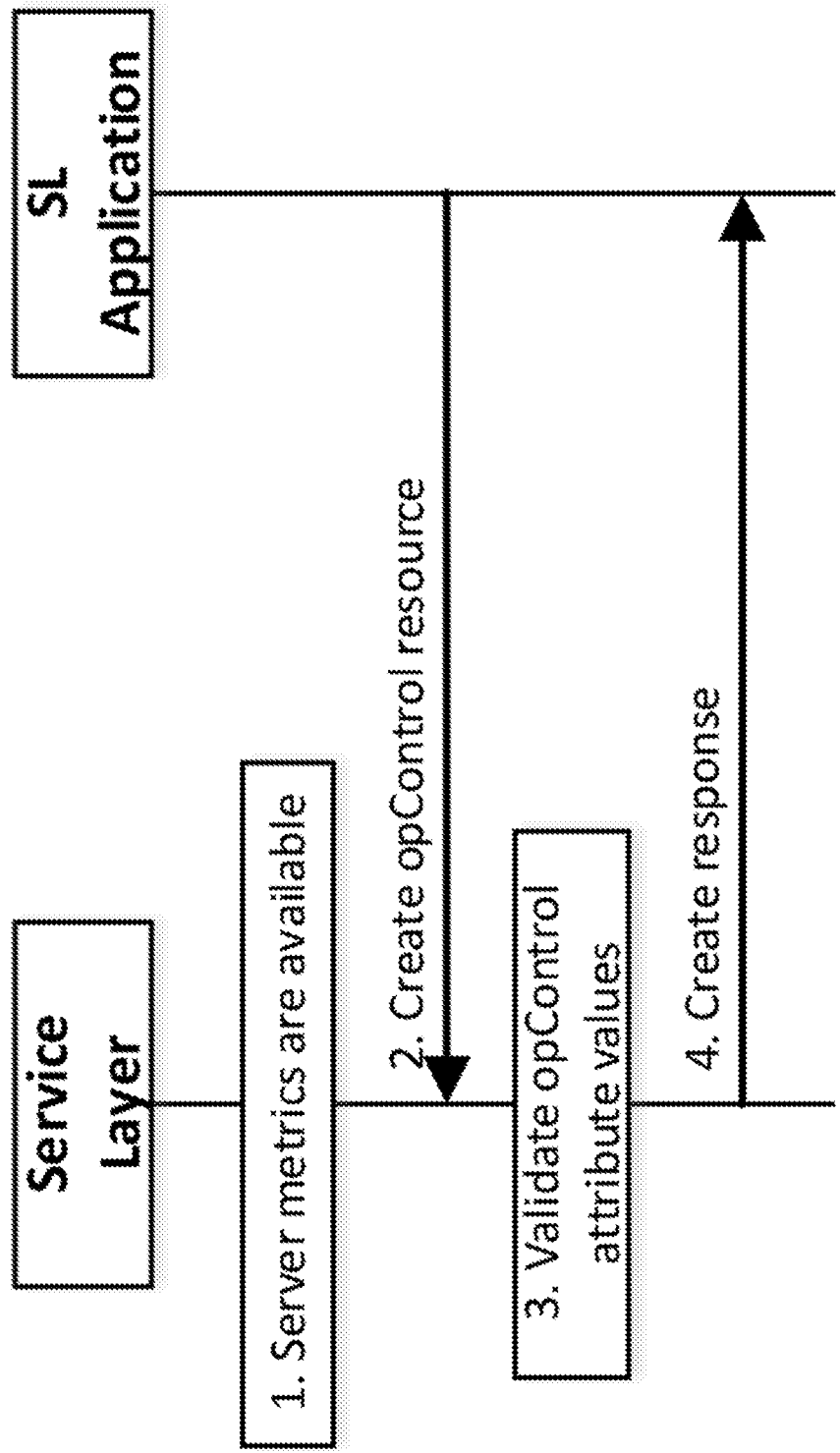
FIG. 3 shows a flow chart of an example procedure to create adaptation rules.

Once a Service Layer is deployed and its operational metrics are available, server administrators may then create adaptation rules that adapt server operations as needed to help prevent server crashes. FIG. 3 shows an example procedure in which a server administrator, realized as a SL Application, creates an adaptation rule on the Service Layer. The following descriptions describe in detail the steps of FIG. 3.

In step 1, at deployment, the operational metrics of the Service Layer may be exposed as an addressable resource. The resource may contain one or more of the attributes shown in Table 1.

In step 2, a SL application acting the part of a server administrator then proceeds to create an adaptation rule on the Service Layer. The opControl resource that is requested to be created may contain the following rule (note the parenthesis symbol are used as delimiters in the expression:

If(memUt>90%)(M-F 09:00,17:00), suspend(ST4, RL3,UPL7) for 30 mins

The expression states "if memory utilization is greater than 90% and the current time is between 9:00 am to 5:00 pm every work day (i.e. Mon-Fri), suspend service types 4 or greater, resource levels 3 or greater, and user priority levels 7 or greater." This particular rule is only concerned with monitoring memory utilization during typical work week hours and only if the memory usage is high. Any requests that require one of the services listed in Table 2 for ST4 or greater, or resources in Table 3 for RL3 or greater, or has a user priority level of 7 or greater, may be denied service by the server. An alternative way to represent the rule is as follows:

If(memUt>90%)(M-F 09:00,17:00), suspend(ST>4, RL>3,UPL>7) for 30 mins

In this case, the service types, resource levels, and user priority levels are specified explicitly using relational expression.

In step 3, the Service Layer validates the request to ensure all relational expressions have matching data types. In addition, the Service Layer may also compare the current rule against existing rules to determine if there are any conflicts.

In step 4, an appropriate response is sent from the Service Layer to the server administrator. The Service Layer may also include a rule ID or other name to identify the rule that was created. If there was a conflict with an existing rule, the Service Layer may include the name of the conflicting rule in the response.

The adaptation rules may also be updated by the administrator should the need arise. The update may be triggered by reports of sluggish operations of the Service Layer by users or tests performed by the server administrators or authorized users. The rules themselves may have been created with threshold values that were either too large or too small. To update a rule, the server administrator or authorized user may need to send a request targeting the rule using either an ID or resource name and provide the attribute and the corresponding value. The Service Layer may check against existing rules to ensure no conflicts are present. Adaptation rules may also be deleted if they are no longer needed.

Figure 4:
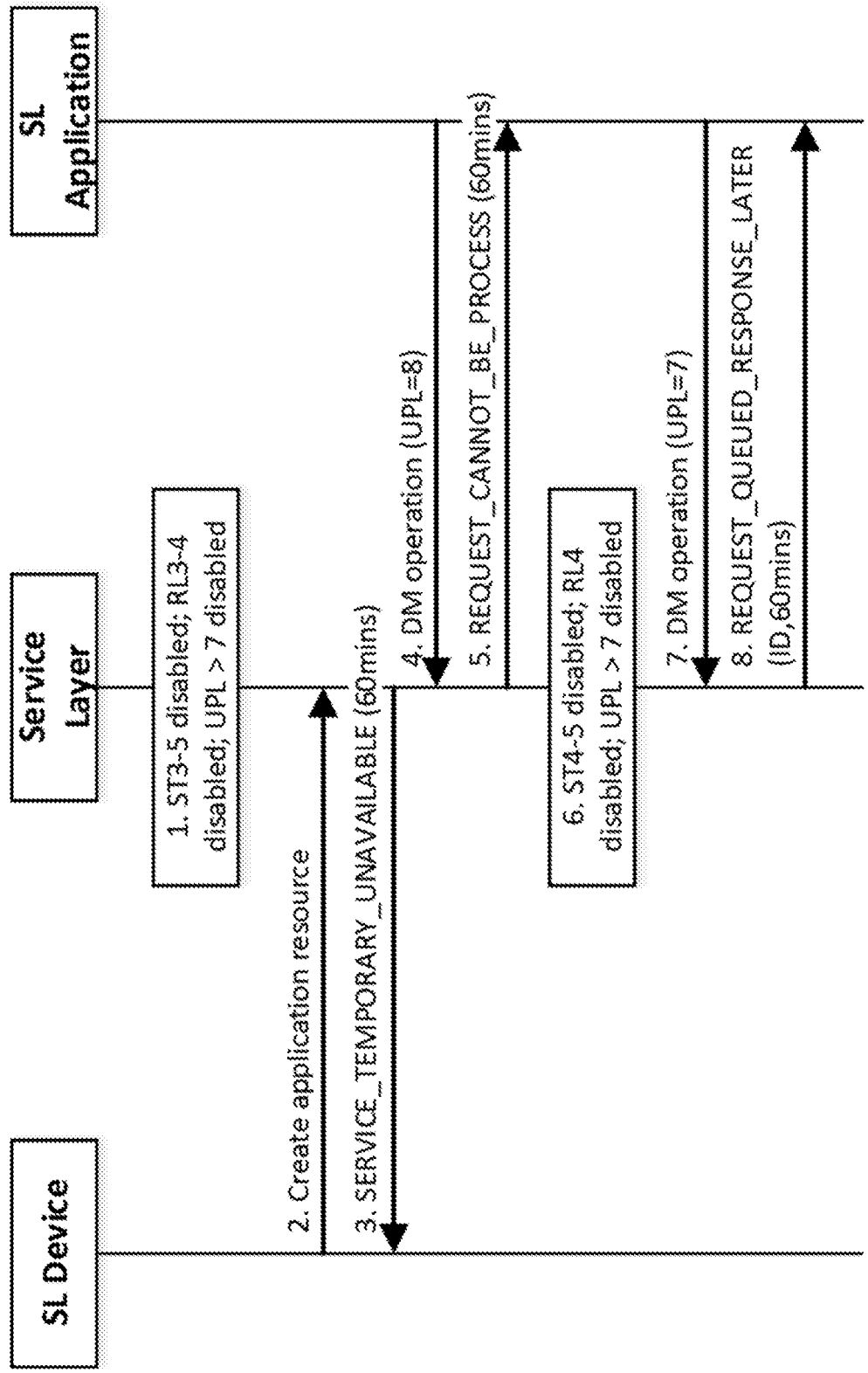
FIG. 4 shows a flow chart of an example method for the usage of new response codes.

Once adaptation rules are created and activated, the Service Layer may provide status of reduced functionality in responses to requests that are not able to be processed. These new response codes may be used during such adaptation so requestors know that the Service Layer is capable of processing the request but is currently unable to. Except for the SERVER_BUSY_TRY_AGAIN response code, all other response codes listed in Table 4 at least indicate the request was validated and ready to be processed. FIG. 4 shows examples of three uses of these new response codes.

The following descriptions describe in detail the steps of FIG. 4:

In step 1, the Service Layer is operating in adaptation mode in which service types 3-5 of Table 2, resource levels 3-4 of Table 3, and user priority levels greater than 7 are all disabled.

In step 2, a SL device submits a request to create an application resource.

In step 3, the Service Layer processes the request and checks the request against the adaptation rules that are currently active. The Service Layer detects that the application resource is listed as a RL4 resource. As a result, the Service Layer returns a SERVICE_TEMPORARY_UNAVAILABLE response code to the SL device. In this case, the Service Layer also informs the SL device that the Service Layer may be able to process the request in 60 minutes. The Service Layer may also generate a report, such as a charging record to record that an operation has been delayed or disallowed. The report may be sent to the MANO system so that the MANO system may consider dedicating more resources to the service layer.

In step 4, a SL application is trying to execute a device management (DM) operation to retrieve some information about a device it is interested in. The request is not critical and hence an UPL value of 8 is included.

In step 5, the Service Layer then evaluates the request and checks the request against the adaptation rules that are currently active. A UPL value is found in the request and its value is compared to the adaptation rule that all RPLs>7 be denied access due to the operational state of the server. As a result, the Service Layer returns a REQUEST_CANNOT_BE_PROCESS response code to the SL device. Similar to step 3, the Service Layer also informs the SL application that the Service Layer may be able to process the request in 60 minutes.

In step 6, during the next 60 minutes, the Service Layer is able to recover and adapt its operations to include support for processing both ST3 services and RL3 resources. However, the Service Layer may still only be able to process UPL 7 and higher priority requests.

In step 7, the SL application sends another DM request but this time, the request is more urgent and the UPL is set to 7.

In step 8, the Service Layer processes the request and checks the request against the adaptation rules that are currently active. The request passes the adaptation rules check but the server is unable to completely process the request. The server returns a REQUEST_QUEUED_RESPONSE_LATER response code to the SL application and provides an ID for the application to use in request-response matching. When the Service Layer is able to send the response, it may include this ID along with the information requested.

In cases where one of the response codes listed in Table 4 and a time duration is provided in a response to a request, the Service Layer may be indicating that the request may be successfully processed if it is sent after the indicated time duration. SL devices should heed the indication and wait until the time duration has elapsed before sending the same request to the Service Layer again. If the SL device sends the same request before the appropriate time has elapsed, the Service Layer may return the same response but with a reduced time duration for when the service may be available. Note that the Service Layer may also lower the user priority levels assigned to the SL device in such an instance.

For the case that a REQUEST_QUEUED_RESPONSE_LATER is returned, the Service Layer may be indicating that the request has been queued and it will be processed at a later time. The ID that is returned may be used to identify the response that results from the Service Layer processing the request. No further action may be required from the SL device—it just needs to save the ID for request-response matching purposes. Additionally or alternatively, the ID may be a URI that is returned to indicate where the response will be stored in the Service Layer. The URI may be accompanied by an expected time the response will be available.

The Service Layer may handle overloaded conditions by disallowing certain types of operations, delaying certain types of operations, and/or prioritizing particular users differently. Additionally or alternatively, the Service Layer may take other, or additional, actions to mitigate congestion situations. For example, the Service Layer could send requests to a MANO System indicating the need for more storage, more memory, more CPU cycles, lower latency storage, and/or lower latency memory. The Service Layer may perform the mitigation actions described herein until the MANO System indicates that the requested resources can be provided.

The request from the Service Layer to the MANO System may include what types of server resources are needed, how long the server resources are needed, what caused the request (e.g., current resource utilization), etc. The response from the MANO System may indicate whether the requested server resources will be provided, when they will be provided, how long they will be provided for, a cost association with the service, a transaction identifier to store in charging records so that charging records can be correlated later, and how much of the specific server resources are being allocated.

The request to the MANO system may also indicate that an instance of an application, service layer, or service is not currently meeting its latency requirements and thus should relocate to a different physical platform in order to meet its latency requirements. For example, the procedures described herein may be used to detect that latency between two endpoints is not acceptable or is increasing and may soon become unacceptable. The request to the MANO System may indicate what two end points are communicating, what their latency requirements are, and which end points may be relocated. In response to the request, the MANO System may move an instance of an application, service, or service layer. For example, an application that was hosted on one small cell platform may move to another small cell platform that is geographically closer to the other endpoint (e.g., application) that may be hosted on a device. Moving the application, service, or service layer instance may involve the MANO System providing the Service Layer with a new Point of Access (PoA) for the application, service, or service layer instance and the Service Layer providing the PoA to the other end point (possibly via a notification).

Example embodiments are described below to demonstrate how the adaptive control of service layer operations can be applied to a Service Layer such as that of a oneM2M CSE (see oneM2M TS-0001, Functional Architecture, V3.7.0). Example embodiments of the proposed methods and systems as applied to the oneM2M standard are described below. New oneM2M attributes, resources, and response codes are shown to realize the different aspects of adapting the operations of a CSE.

The user priority levels proposed herein can be realized as oneM2M attributes for either the <AE> or <CSE> resource. An <AE> or <CSE> can specify a desired range of priority levels upon registration if it is aware of the possible values. Additionally or alternatively, the <m2mServiceSubscriptionProfile> resource may be able to provide these priority levels and the CSE can use the pre-provisioned values to assign them to AEs and CSEs at registration.

The user priority levels may be used to override certain SL adaptation controls that are in effect at the time the request is made. The userPriorityLevels attribute of an <AE> or <CSE> resource may be used implicitly or explicitly by the requestor during such adaptation. For example, an <AE> may have a userPriorityLevels attribute specified as "createContainer=5, multicast=10, notification=3" where user priority ranges from 1 to 10 with 1 being the highest priority. In this case, when an AE sends a request to create a container, the CSE may apply a UPL of 5 to the request. This is an implicit application of the UPL attribute. In an example explicit application, the AE may provide the UPL in the request directly. In this case, the CSE may use the explicitly provided UPL instead of the one provided in the <AE> resource.

TABLE 5

Proposed oneM2M AE or CSE Attribute

| Attribute Name | Description |
| --- | --- |
| userPriorityLevels | A complex type that has an assigned priority level associated with certain services and/or resources to indicate what user priority level should be used for requests targeting such services. A UPL range without the associated services may indicate the requestor has the ability to specify individual UPL values on a per request basis. For example, a range of [5-10, 7] indicates the requestor can submit requests with UPL values explicitly between 5 and 10. In the absence of a UPL in the request, the default value of 7 is used. |

A CSE's operational metrics may be realized as a new oneM2M resource cseMetrics. This resource may be located under the <cseBase> resource, under a <node> resource associated with the CSE, or in another location within the CSE's resource tree. If located under the <node> resource, cseMetrics may be a specialization of the <mgmtObj> resource type. The operational metrics for the CSE may then be the attributes of the cseMetrics resource. Table 6 shows examples of operational metrics that may be used to quantify the state of the CSE's operations. These attributes may have Read Only (RO) access as the values presented may be generated by the CSE itself and cannot be modified by external users.

TABLE 6

Proposed oneM2M cseMetrics Resource Attributes

| Attributes of <cseMetrics> | Multiplicity | RW/RO/WO | Description | <cseMetricsAnnc> Attributes |
|---|---|---|---|---|
| Universal and common attributes | * | * | See clause 9.6.1.3 of oneM2M TS-0001. | OA |
| resDiscLatency | 0 . . . 1 | RO | The time it takes to perform resource discovery. This may be presented as an average time (calculated by the time resource discovery response was sent minus the time the request was received), a minimum time, and/or a maximum time. | OA |
| semanticQueryLatency | 0 . . . 1 | RO | The time it takes to perform semantic query. This may be presented as an average time (calculated by the time semantic query response was sent minus the time the request was received), a minimum time, and/or a maximum time. | OA |
| dBReadLatency | 0 . . . 1 | RO | The time it takes to read the database. This may be presented as an average time (calculated by the time database query was received minus the time the database query was sent), a minimum time, and/or a maximum time. | OA |
| dBWriteLatency | 0 . . . 1 | RO | The time is takes to write to the database (for Create, Update, Delete operations). This may be presented as an average time (calculated by the time database write was received minus the time the database write was sent), a minimum time, and/or a maximum time. | OA |
| requestProcessingLatency | 0 . . . 1 | RO | The time it takes to process a CSE request. This may be presented as an average time (calculated by the time CSE response was sent minus the time the CSE request was received), a minimum time, and/or a maximum time. | OA |
| throughput | 0 . . . 1 | RO | The number of requests received by the CSE per second. This may be computed as a moving average of receiving incoming requests over a time period such as 30 minutes, which may be implementation dependent. | OA |
| errorRate | 0 . . . 1 | RO | The percentage rate that the CSE returns an error code indicating it was a server error (i.e. 5xxx). This may be a ratio of the number of error responses to the total number of successful responses sent by the CSE over a certain time period, such as 30 minutes. Note error messages due to adaptive control of the CSE may not be considered error responses. However, this may be implementation dependent. | OA |
| numPendingRequests | 0 . . . 1 | RO | Number of pending CSE requests in the processing queue. This value is a running total of all pending requests that have not been sent a response by the CSE. | OA |
| numSubscriptions | 0 . . . 1 | RO | Number of subscription resources. This is a dynamic value that shows the total number of created subscription resources. The total includes deletions of subscription requests. | OA |
| notificationRate | 0 . . . 1 | RO | Percentage rate of sending notifications as compared to all messages sent by the CSE. This may be computed as the ratio of the total number of notifications sent by the CSE to the total number of all messages sent by the CSE over a certain time period, such as 30 minutes. | OA |

The adaptive control to the CSE's operations may be realized through the cseAdaptRule resource. This resource may be located in the same location as the cseMetrics resource, for example as child resources of <node>, or as a child resource of the cseMetrics resource. Alternatively, an attribute may be added to the cseAdaptRule resource to link to a cseMetrics resource and the cseAdaptRule may be located elsewhere in the resource tree. One or more cseAdaptRule resources may be created to specify different adaptation rules for controlling the CSE. Table 7 shows example attributes for the cseAdaptRule resource in which adaptation rules may be created.

TABLE 7

Proposed oneM2M cseAdaptRule Resource Attributes

| Attributes of <cseAdaptRule> | Multiplicity | RW/RO/WO | Description | <cseAdaptRuleAnnc> Attributes |
|---|---|---|---|---|
| Universal and common attributes | * | * | See clause 9.6.1.3 of oneM2M TS-0001. | OA |
| ruleID | 1 | RO | An identifier assigned by the CSE to identify the adaptation rule specified by the following attributes. | OA |
| metricLinks | 1 (L) | RW | URI(s) of CSE metric resources in which this rule is linked to. | OA |
| opMetrics | 1 (L) | RW | A relational expression comparing a CSE metric against some threshold value. The format is:<br>metric [>, <=, >=, <=, !=] thresholdValue<br>Metric is provided by a cseMetrics attribute that is linked using the cseMetricLink attribute. When multiple expressions are provided, all expressions must be satisfied in order for the command to be applied, i.e. the expressions are ANDed together when they are evaluated. | OA |
| timeWindow | 0 . . . 1 | RW | Two time values that form a window in which metric monitoring is enabled; outside the time window, no monitoring is performed. The format of the time values may be:<br>1) 12:00pm-3:00pm<br>2) 12:00-15:00<br>3) M 22:00, Tu 7:00<br>4) M-Tu 18:00-00:00<br>In both 1) and 2), the time window is from 12:00pm to 3:00pm. In 3), the time window is Mon 3:00pm to Tues 7:00am while in 4), the time window is on Mondays and Tuesdays from 6:00pm to midnight. | OA |
| command | 1 | RW | A command used to adapt CSE operations based on a successful comparison of the CSE metric against a threshold value. Commands may be enable, disable, suspend, resume, etc. The command may be applied to the features, resources, and userPriorityLevels attributes. | OA |
| features | 1 (L) | RW | A list of features in the Features Catalog that the command attribute applies to. For example, "disable {group, registration}" would disable group and registration services so requests needing these services may temporarily be denied. | OA |
| resources | 0 . . . 1 (L) | RW | A list of new resource instances that the command attribute applies to. For example, "disable {AE, subscription}" would prevent any requests from creating an AE or subscription resource instance while the CSE is in a reduced functional state and the associated adaptation rule is in effect. | OA |
| userPriorityLevels | 0 . . . 1 | RW | A relational expression that specifies what user priority levels the command attribute applies to. For example, the expression (UPL > 7) specifies that user priority levels above 7 are disabled if command = disable. | OA |
| duration | 0 . . . 1 | RW | A relative time that specifies the duration the CSE operations that will be adapted based on the command. A null value or an "inf" value may signify an indefinite duration. Alternatively, the duration may be specified as a relational expression that specifies some metrics must meet a certain threshold in order for the rule to be deactivated. For example, an expression such as "throughput < 50%" may be used for this attribute. | OA |

The following response codes are proposed to be added to the oneM2M response codes (see oneM2M TS-0004, Service Layer Core Protocol, V2.5.0). Table 8 shows the new response codes being added to the 5xxx series codes for the Receiver Error response class. These response codes are grouped together into the 53xx sub-class to differentiate them from the existing response codes. These response codes may be used to indicate that the CSE is running in a reduced functional state.

TABLE 8

New oneM2M Response Codes

| Numeric Code | Description |
| --- | --- |
| 5000 | INTERNAL_SERVER_ERROR |
| 5001 | NOT_IMPLEMENTED |
| 5103 | TARGET_NOT_REACHABLE |
| 5105 | NO_PRIVILEGE |
| 5106 | ALREADY_EXISTS |
| 5203 | TARGET_NOT_SUBSCRIBABLE |
| 5204 | SUBSCRIPTION_VERIFICATION_INITIATION_FAILED |
| 5205 | SUBSCRIPTION_HOST_HAS_NO_PRIVILEGE |
| 5206 | NON_BLOCKING_REQUEST_NOT_SUPPORTED |
| 5207 | NOT_ACCEPTABLE |
| 5208 | DISCOVERY_DENIED_BY_IPE |
| 5300 | SERVER_BUSY_TRY_AGAIN |
| 5301 | SERVICE_TEMPORARY_UNAVAILABLE |
| 5302 | REQUEST_CANNOT_BE_PROCESS |
| 5303 | REQUEST_QUEUED_RESPONSE_LATER |
| 5304 | ACCESS_DENIED_PRIORITY_LEVEL |

The following procedures demonstrate how the oneM2M system can be realized with the methods and systems proposed herein. A CSE may have a CSEBase name "CSE01" and a cseMetrics resource may be created under CSE base during deployment. The cseMetrics resource may have a URI "/CSE01/cseMetrics" and access to cseMetrics may be provided to CSE administrators. The cseAdaptRule resources may be created under "/CSE01" or alternatively, they may be child resources of the cseMetrics resource. In this case, the cseMetricLink attribute shown in Table 7 may be omitted.

During AE registration, the user priority levels may be configured for an AE and similarly for a CSE during CSE registration. An AE can include the userPriorityLevels attribute in the AE registration if it was provisioned with a policy during the onboarding procedure. Additionally or alternatively, CSE01 may obtain user priority level information from a <m2mServiceSubscriptionProfile> resource for the AE.

Figure 5:
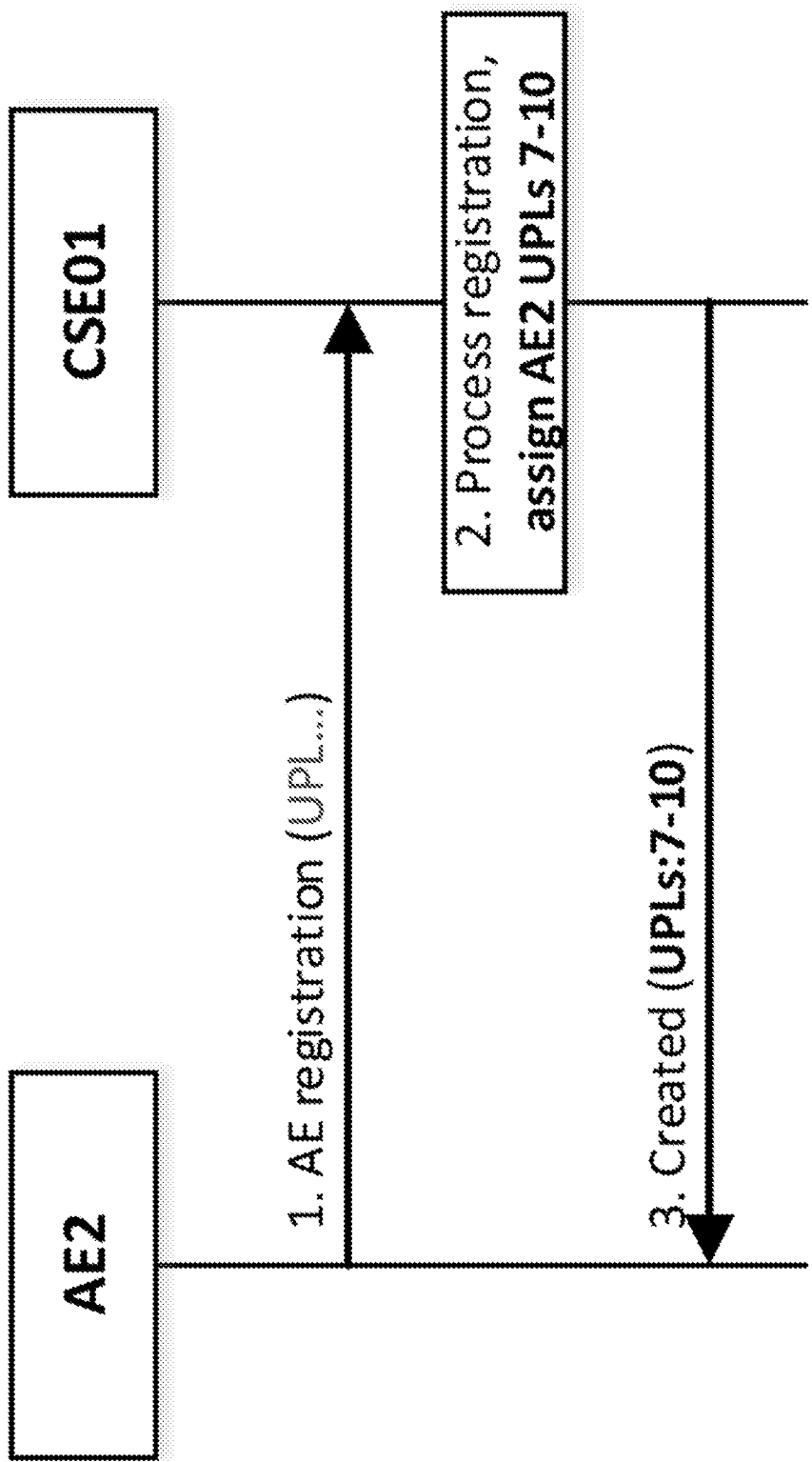
FIG. 5 shows a flow chart of an example configuration of user priority levels during application entity registration.

The following descriptions describe in detail the steps of FIG. 5:

In step 1, during AE registration, AE2 may include a policy for the userPriorityLevels attribute if it was provisioned with one. The policy may provide a range of user priority levels AE2 can use to make requests with explicitly. Additionally or alternatively, the policy may be more fine grained and describes different priority levels for different services and resource requests.

In step 2, CSE01 processes the registration request and assigns appropriate user priority levels if available. In the absence of the userPriorityLevels attribute in the request, CSE01 may also obtain the policy from a <m2mServiceSubscriptionProfile> or other similar resource associated with AE2.

In step 3, if registration was successful, CSE01 returns the policy of the user priority levels that have been assigned to AE2 along with the response code.

Figure 6:
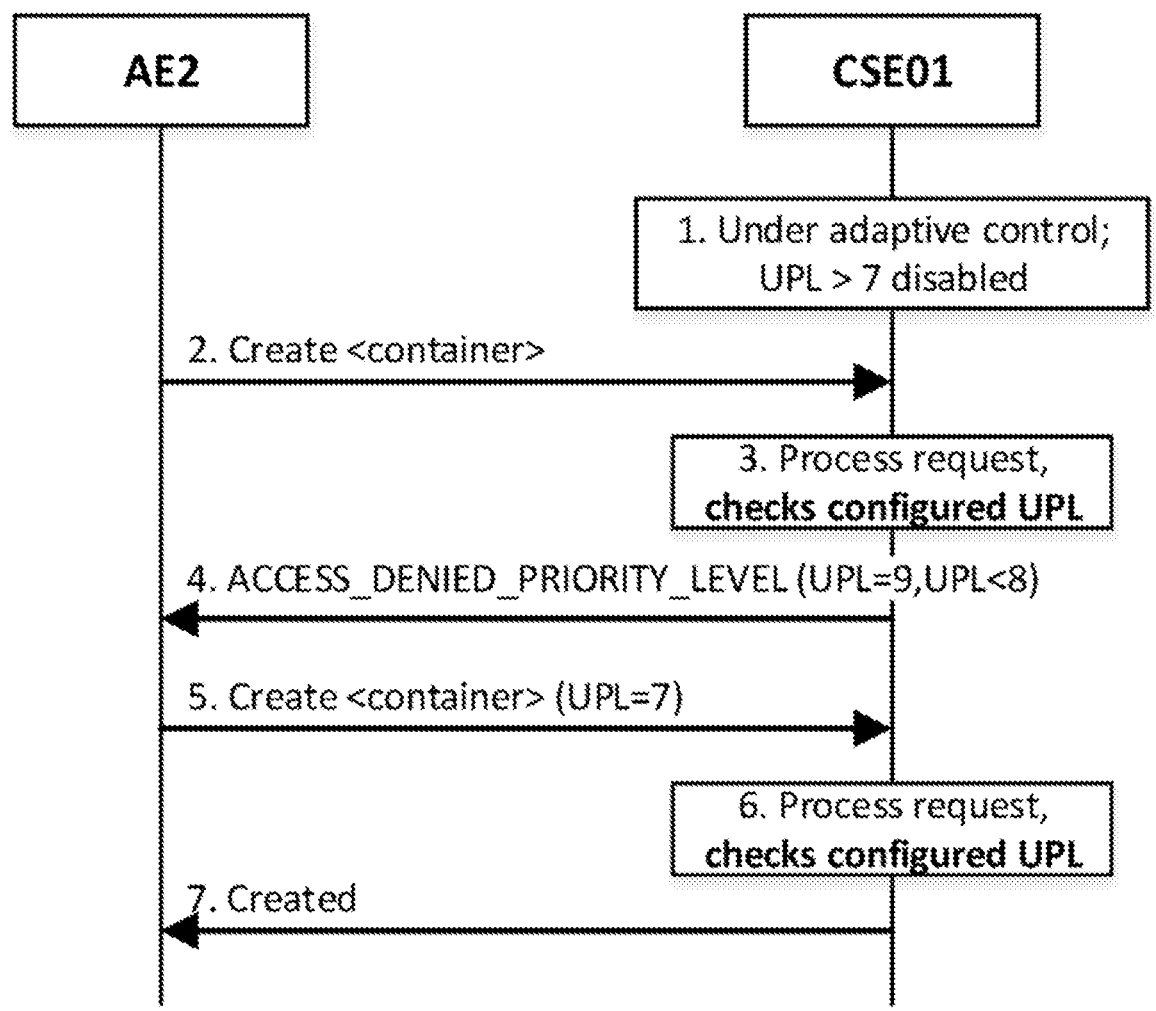
FIG. 6 shows a flow chart of an example request containing user priority levels.

Once a userPriorityLevels policy has been configured, AE2 may then use one of the assigned user priority levels in future requests to CSE01. If the policy provides specific priority levels for certain services or resources, future requests may use the implicit method of specifying user priority levels. CSE01 may check the policy provided in the userPriorityLevels attribute associated with AE2 to evaluate access to the targeted services or resources. AE2 may also provide the userPriorityLevels explicitly in the request. FIG. 6 shows an example of both cases in operation.

The following descriptions describe in detail the steps of FIG. 6:

In step 1, CSE01 is under adaptive control and currently has disabled processing requests with UPL greater than 7. AE2 had previously registered with CSE01 and was provisioned with a userPriorityLevels policy in which creating a container resource was assigned a range of UPLs between 7 to 10 and with a default value of 9. The default UPL value is applied to AE2's create container requests where no UPL are explicitly specified. However, AE2 can override this default value by including a userPriorityLevels attribute in the create request that is between UPLs of 7 to 10.

In step 2, AE2 sends a create container request in which no UPL is provided.

In step 3, CSE01 processes the request and evaluates the UPL associated with AE2 against the adapted UPL. The comparison shows that AE2's UPL for this request (create container) is 9, which is greater than the adapted UPL of greater than 7. As a result, the request is denied.

In step 4, CSE01 returns an ACCESS_DENIED_PRIORITY_LEVEL code in the response. The response also includes the priority levels that are currently disabled by CSE01 and may include the default UPL used in evaluating the request for AE2.

In step 5, AE2 sends another create container request but this time with a UPL of 7.

In step 6, CSE01 process the request and checks the provided UPL against the adapted UPL. The validation is successful and CSE01 allows the request to be processed to completion.

In step 7, CSE01 returns a Created response.

Note that AE2 may be limited to specify a UPL value in step 5 that is within range of the values provisioned to its userPriorityLevels attribute during AE registration. Specifying a value outside this range will result in a CONTENTS_UNACCEPTABLE response code being returned. The CSE may also include the acceptable range in the response. In this case, the UPL value provided is outside the range provisioned to AE2 and hence, the contents of the request may not be acceptable.

Figure 7:
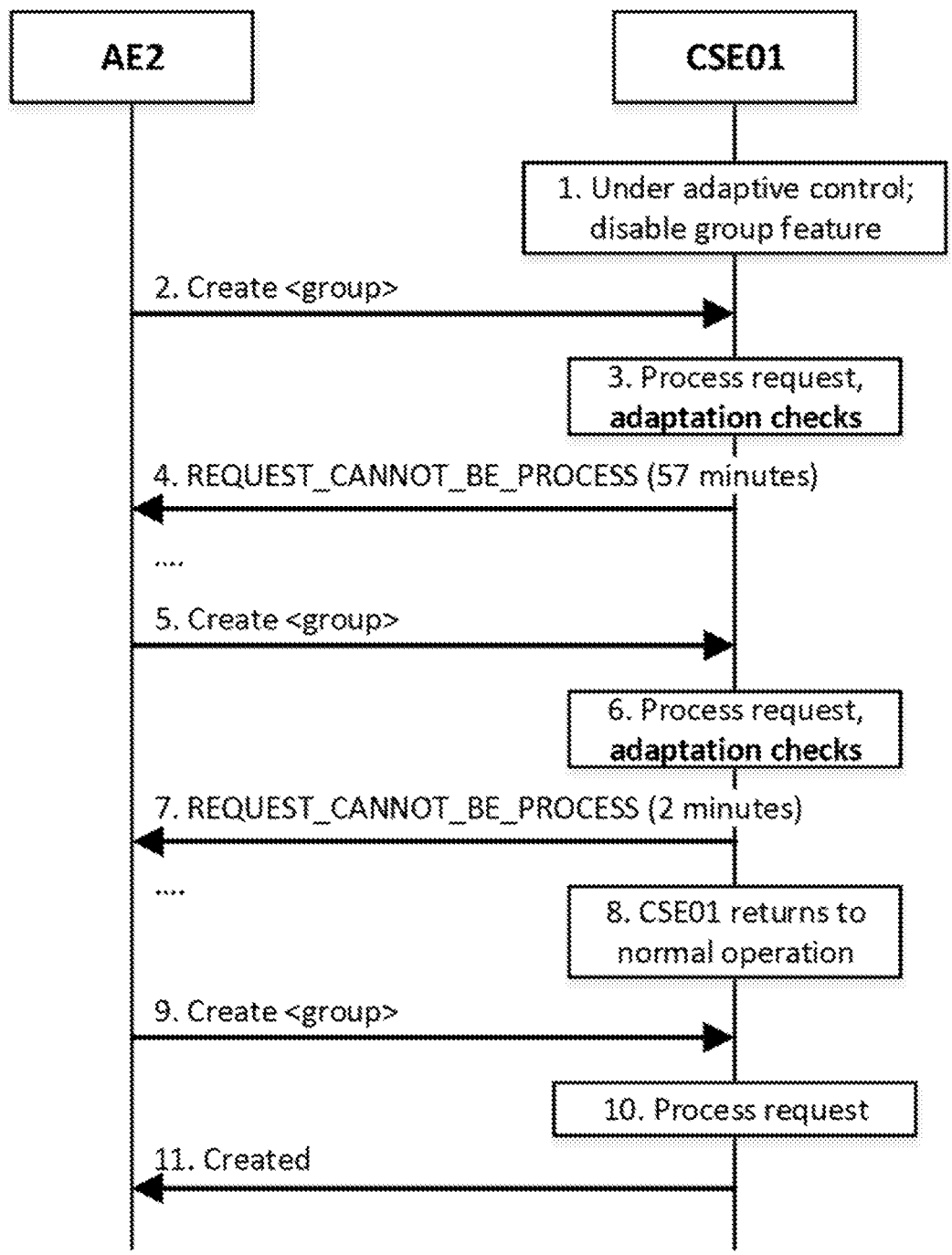
FIG. 7 shows a flow chart of an example of response code feedback during CSE adaptation.

Once CSE01 is under adaptive control, it can provide indications of when normal operations may resume along with the response code. FIG. 7 shows an example call flow in which CSE01 notifies AE2 of the anticipated time normal CSE operations may resume. In this case, CSE01 is under adaptive control where the Group feature is disabled. Note the following call flow does not show all the checks CSE01 performs when evaluating a request such as message validation and access control checks.

The following descriptions describe in detail the steps of FIG. 7.

In step 1, CSE01 is under adaptive control and currently has disabled processing group requests.

In step 2, AE2 sends a create group request.

In step 3, CSE01 processes the request and performs an adaptive control check to determine if the request is allowed.

In step 4, CSE01 returns a response with the REQUEST_CANNOT_BE_PROCESS code along with the expected time that the group processing feature will be enabled. In this case, 57 minutes remain until CSE01 can process group requests again.

In step 5, after some time, AE2 sends another create group request.

In step 6, CSE01 processes the request and performs an adaptive control check to determine if the request is allowed.

In step 7, CSE01 returns a response with the REQUEST_CANNOT_BE_PROCESS code along with the expected time that the group processing feature will be enabled. In this case, only 2 minutes remain until CSE01 can process group requests again.

In step 8, the adaptive control period is over and CSE01 resumes normal operations.

In step 9, AE2 sends a create group request.

In step 10, CSE01 allows the request to be processed since adaptive control has expired.

In step 11, CSE01 returns a Created response if the request was processed successfully.

The CSE adaptation may be triggered by the activation of one or more adaptation rules. These rules may be realized as cseAdaptRule resources that CSE administrators create to adapt the operations of the CSE to changing system conditions. These adaptation rules may contain a monitoring component and a command component, which adapts the operations of the CSE. The monitoring component may depend on operational metrics provided for the CSE. Table 9 shows two examples of operational metrics that may be available in a CSE. The hwMetrics resource provides hardware centric metrics such as CPU utilization and may be represented as percentages of available server resources. The cseMetrics resource provides CSE specific metrics that describes the loading of the CSE. Each metric may be represented as a triple in the form of [minimum,current, maximum].

TABLE 9

Examples of Operational Metrics for a CSE

| hwMetrics | cseMetrics |
|---|---|
| URI: /cse01/hwMetrics | URI: /cse01/cseMetrics |
| cpuUtilization = [10, 32, 74] | resDiscLatency = [3, 21, 59] |
| memUtilization = [43, 57, 73] | semanticQueryLatency = [75, 202, 503] |
| storUtilization = [10, 22, 32] | dBReadLatency = [5, 11, 22] |
| diskIOUtilization = [27, 35, 42] | dBWriteLatency = [20, 33, 47] |
|  | reqProcessingLatency = [10, 47, 500] |
|  | throughput = [28, 73, 84] |
|  | errorRate = [0.1, 0.2, 0.3] |
|  | numPendingRequests = [3, 25, 41] |
|  | numSubscriptions = [48, 73, 101] |
|  | notifRate= [11, 15, 23] |

Using the metrics shown in Table 9, CSE administrators can create adaptation rules that monitors and adapts the CSE's operations as needed. Table 10 shows an example cseAdaptRule resource in which the CSE is programmed to monitor memory usage. The name opRule1 is given to this resource and the CSE assigns a rule ID of "rid01" to the resource. The rule is monitoring the memUtilization attribute provided by the hwMetrics resource and specifies that if the current memory utilization exceeds the maximum memory utilization by 10%, the CSE should suspend both the group fanout and semantic query services. This monitoring is only performed within a time window of 7:00 am to 10:00 pm daily from Monday to Friday. In addition, all requests with user priority levels greater than 8 are denied access until the rule expires, which is configured for 60 minutes.

TABLE 10

Example Adaptation Rule 1
opRule1

| ruleID | rid01 |
|---|---|
| metricLink | /cse01/hwMetrics |
| opMetrics | curr(memUtilization) – max(memUtilization) > 10 |
| timeWindow | M-F 7:00-22:00 |
| command | suspend |
| services | group fanout, semantic query |
| resources | null |
| userPriorityLevels | upl > 8 |
| duration | 60 mins |

Table 11 shows a second adaptation rule example in which the CSE is monitoring that if both CPU and memory utilizations are above 90%, the CSE will adapt operations to suspend services such as group fanout, remote operations, transaction management, etc. In addition, the oneM2M resources listed for the resources attribute are denied access for create or execute operations and all requests with UPL values above 5 are also denied access. This adaptation is temporary and has a 5-minute expiration time. All suspended services, resources, and UPLs will resume operations after 5 minutes.

TABLE 11

Example Adaptation Rule 2
opRule2

| ruleID | rid02 |
|---|---|
| metricLink | /cse01/hwMetrics |
| opMetrics | cpuUtilization > 90, memUtilization > 90 |
| timeWindow | null |

TABLE 11-continued

Example Adaptation Rule 2
opRule2

| | |
|---|---|
| command | suspend |
| services | group fanout, semantic query, CMDH, remote operations, transaction, . . . |
| resources | group, pollingChannel, subscription, statsCollect, . . . |
| userPriorityLevels | upl > 5 |
| duration | 5 mins |

The adaptation rules may use multiple metric resources as shown in Table 12. This rule uses the metrics provided by both hwMetrics and cseMetrics resources. In this case, all the attribute names must be unique from one another. This rule is monitoring 4 metrics, 3 of which are associated with the database and the fourth metric monitors if the request processing latency is taking too long to process incoming requests. Each of the monitored metrics must be valid in order for the rule to be activated. Finally, the rule has a relational expression for the duration attribute, which states that opRule3 will resume operations when the request processing latency is less than 50%.

TABLE 12

Example Adaptation Rule 3
opRule3

| | |
|---|---|
| ruleID | rid03 |
| metricLinks | /cse01/hwMetrics,/cse01/cseMetrics |
| opMetrics | diskIOUtilization > 75, dBReadLatency > max( ), dBWriteLatency > max( ), reqProcessingLatency > 300 |
| timeWindow | null |
| command | suspend |
| services | CMDH, transaction, . . . |
| resources | AE, delivery, group, pollingChannel, subscription, . . . |
| userPriorityLevels | upl > 7 |
| duration | reqProcessingLatency < 50 |

All the rules described previously demonstrate the temporary suspension of services or operations within the CSE. Rules may be created such that services or operations are disabled explicitly and may need a corresponding rule to re-enable the services or operations. Table 13 and Table 14 show companion rules in which all services, operations, and user priority levels are disabled if the error rate within the CSE exceeds 50%. This condition signifies there may be some internal CSE problems that are resulting in error responses being returned at a high rate than normal to user's requests. opRule4 is the rule that disables CSE operations while opRule5 is used to re-enable CSE operations. This mechanism may be used to give CSE administrators total control of CSE operations to address potential internal server problems in which no timeframe exists for resolution. opRule4 may also be used to gracefully terminate CSE operations before powering down the actual hardware server.

TABLE 13

Example Adaptation Rule 4
opRule4

| | |
|---|---|
| ruleID | rid04 |
| metricLink | /cse01/cseMetrics |
| opMetrics | errorRate > 50 |

TABLE 13-continued

Example Adaptation Rule 4
opRule4

| | |
|---|---|
| timeWindow | null |
| command | disable |
| services | all |
| resources | all |
| userPriorityLevels | all |
| duration | null |

TABLE 14

Example Adaptation Rule 5
opRule5

| | |
|---|---|
| ruleID | rid05 |
| metricLink | /cse01/cseMetrics |
| opMetrics | errorRate < 2 |
| timeWindow | null |
| command | enable |
| services | all |
| resources | all |
| userPriorityLevels | all |
| duration | null |

In a oneM2M architecture, the procedures that are described above for the SL interactions to a MANO system may be mapped to the oneM2M Mcn reference point. For example, the procedures may run on protocols such as MPLS, OpenFlow, NETCONF, SNMP, CLI, PCEP, i2RS, etc.

Figure 8:
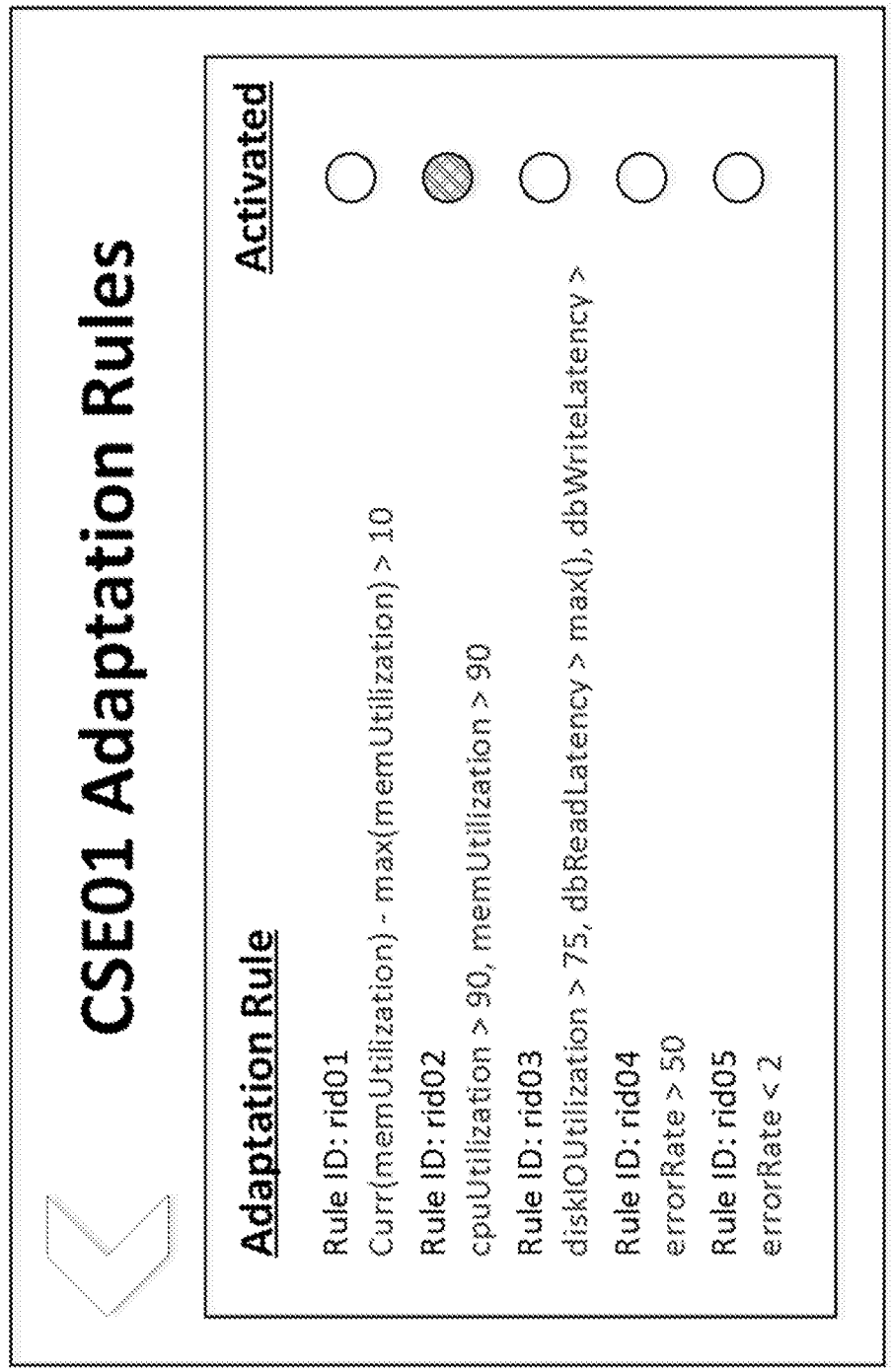
FIG. 8 shows an example user interface.

The adaptation rules of the CSE can be readily displayed in a user interface for CSE administrators to monitor if any rules are currently active. FIG. 8 shows an example user interface listing all the adaptation rules created on a CSE. The user interface may have a column of radial button to indicate whether a particular rule is activated. A CSE administrator can click on a Rule ID associated with a rule to obtain more information about the rule.

Figure 9A:
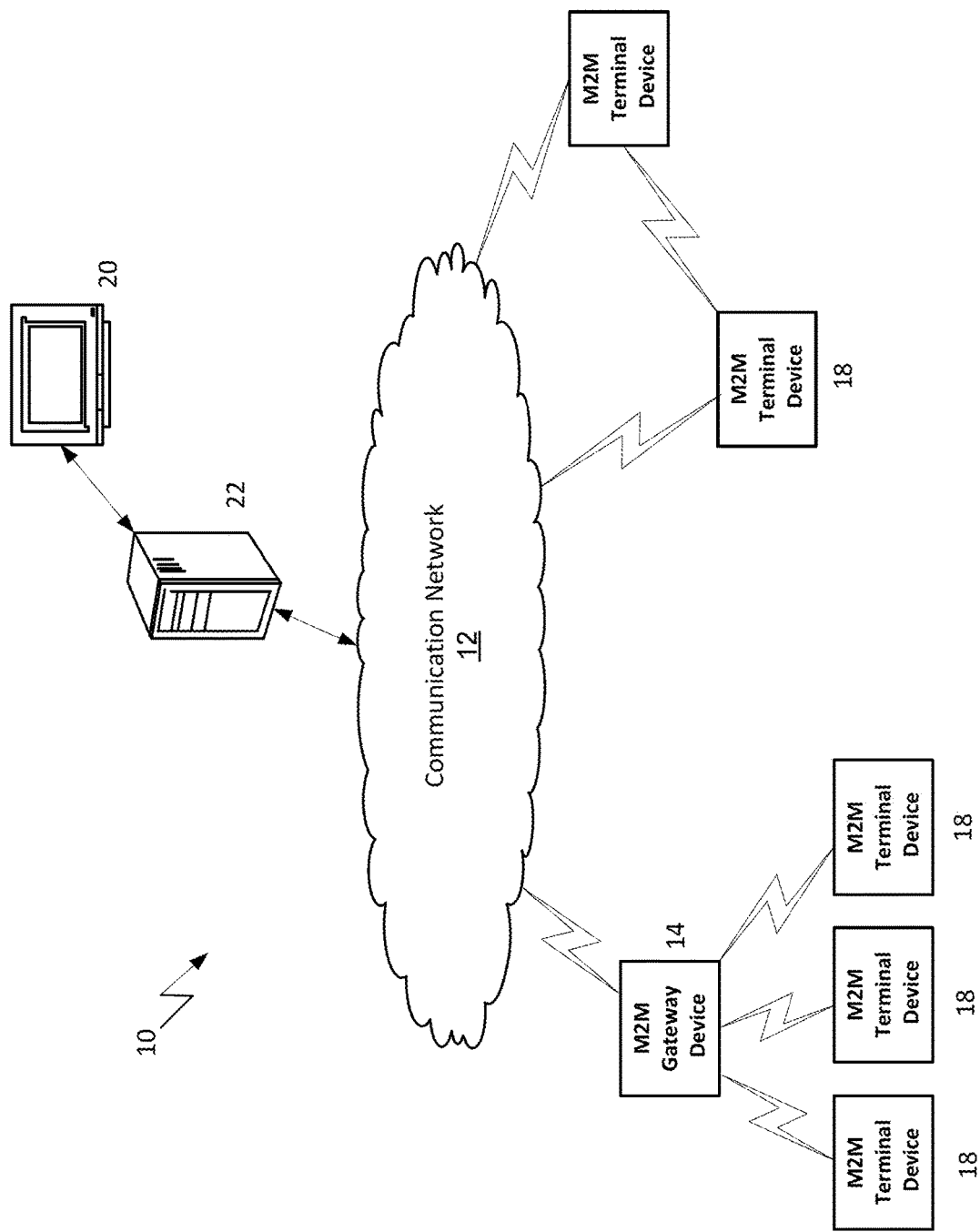
FIG. 9A shows an example system diagram of an example machine-to-machine (M2M) or Internet of Things (IoT) communication system in which one or more disclosed embodiments may be implemented.
Figure 9B:
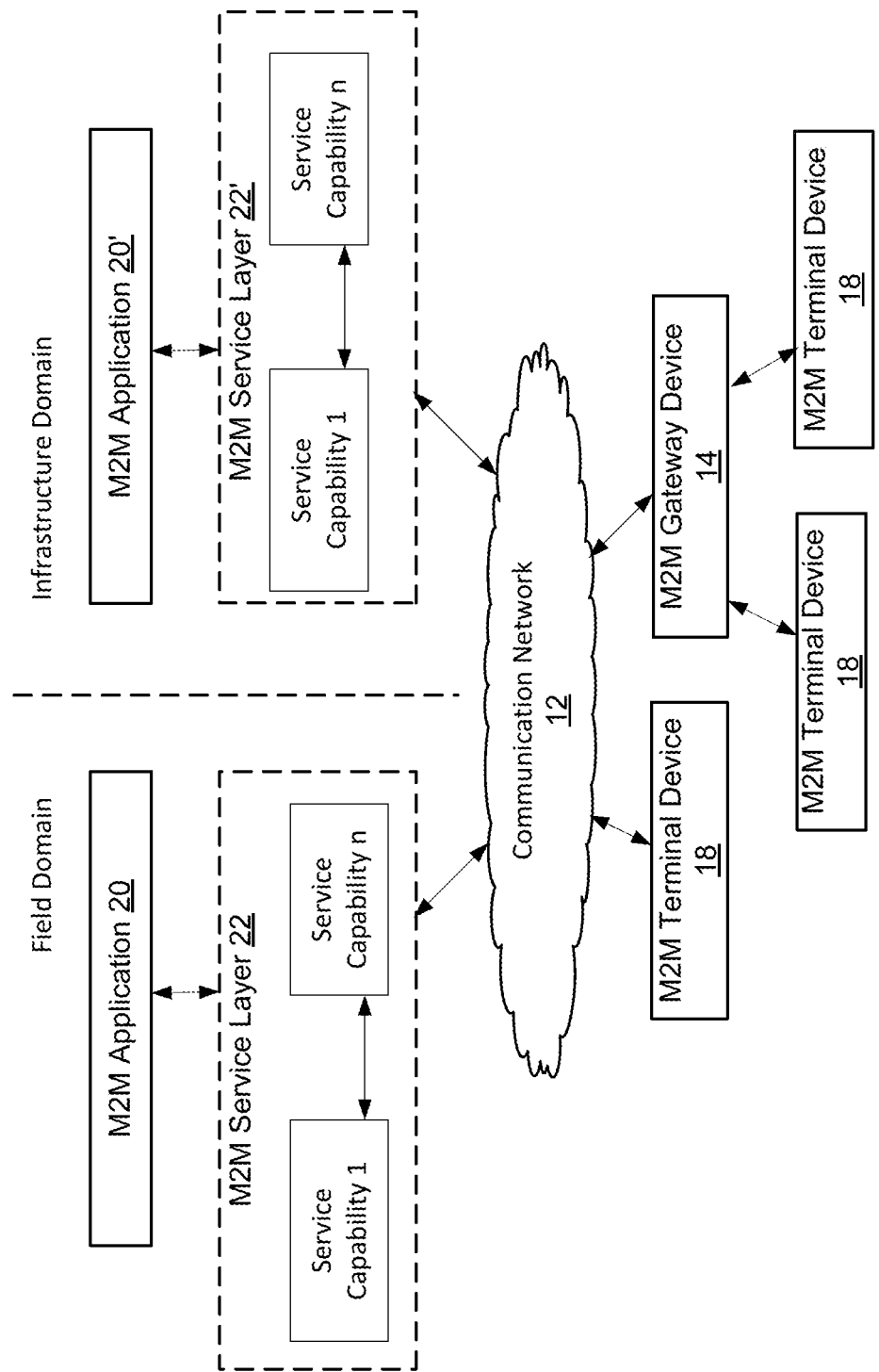
FIG. 9B shows an example system diagram of an example architecture that may be used within the M2M/IoT communications system illustrated in FIG. 9A.
Figure 9C:
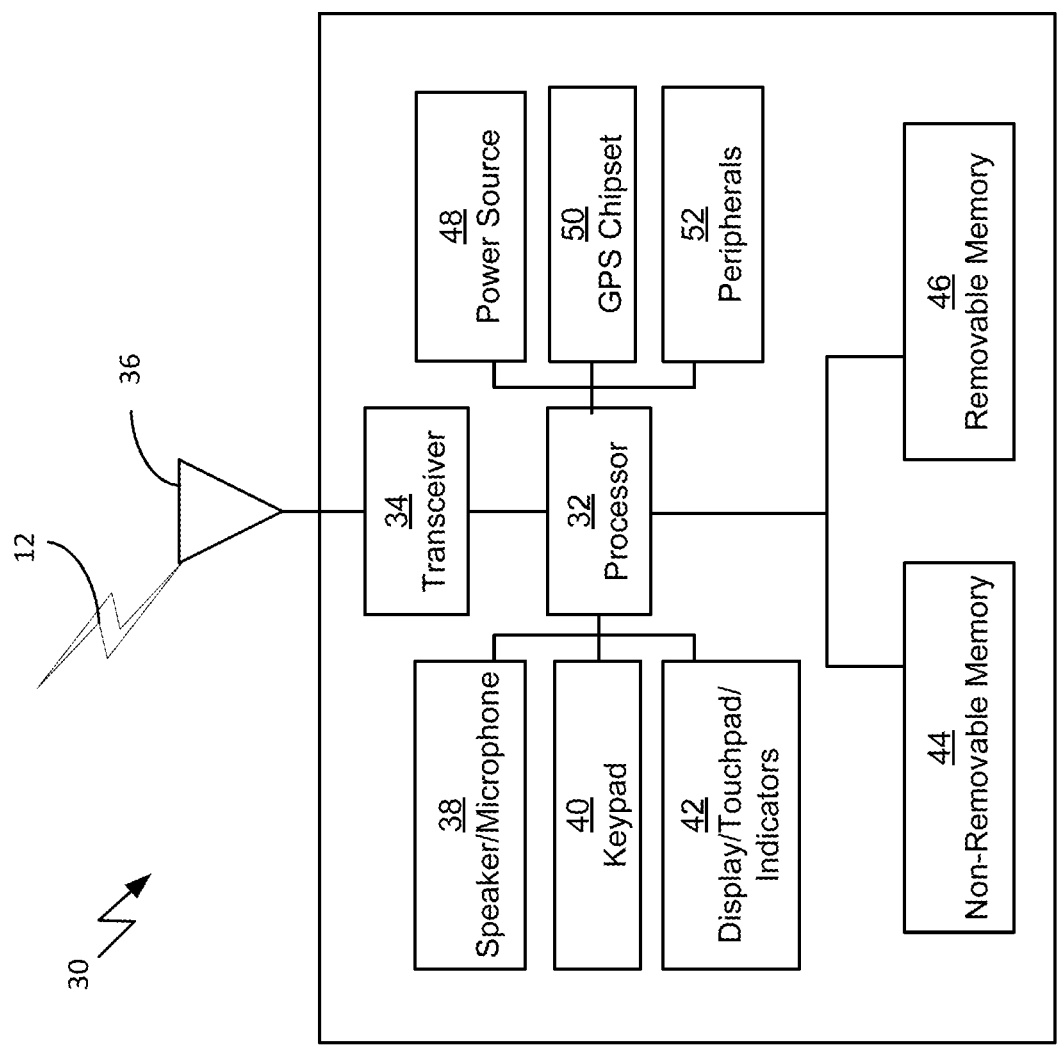
FIG. 9C shows an example system diagram of an example M2M/IoT terminal or gateway device that may be used within the communications system illustrated in FIG. 9A.
Figure 9D:
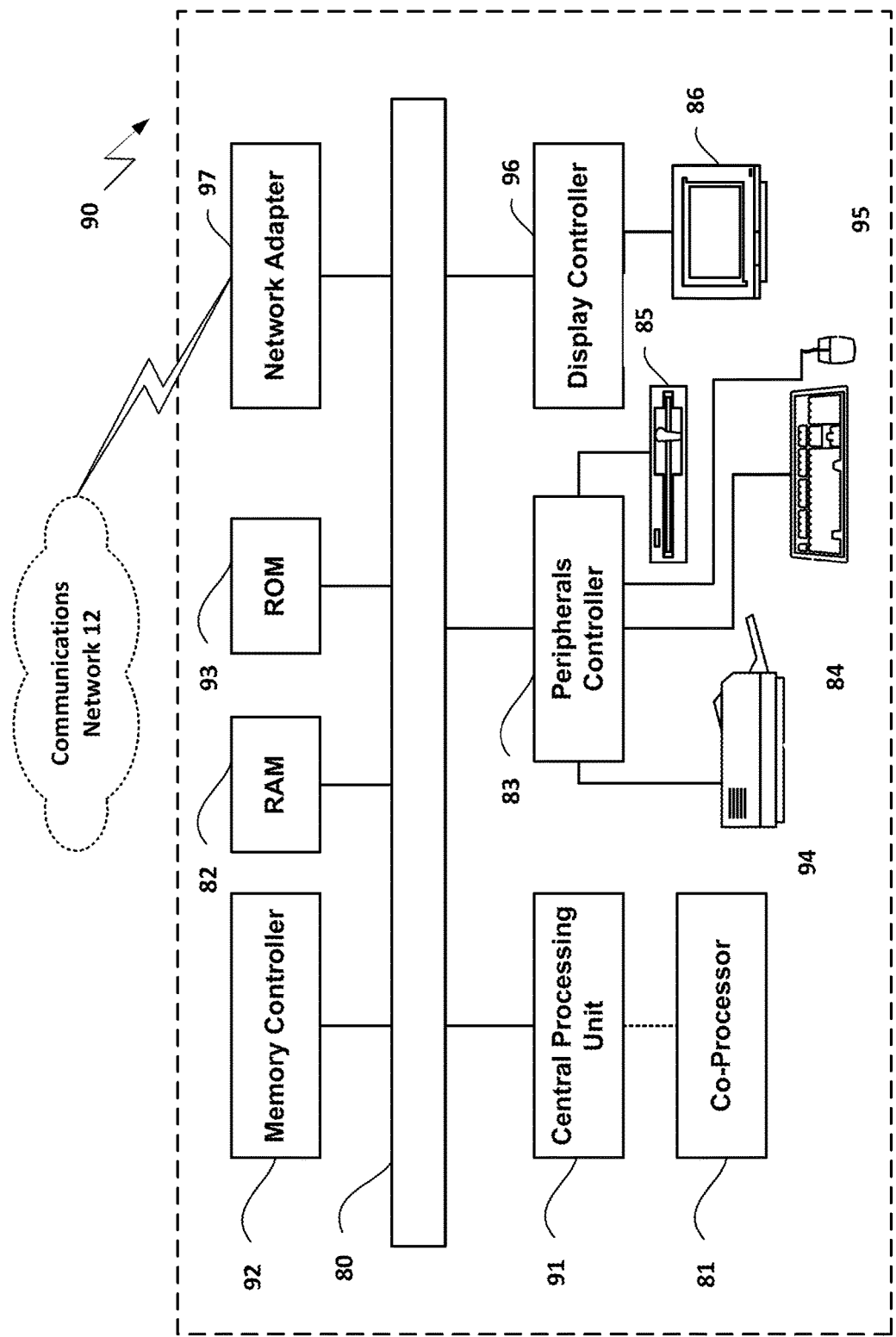
FIG. 9D shows an example block diagram of an example computing system in which aspects of the communication system of FIG. 9A may be embodied.

Any of the entities performing the steps illustrated in FIGS. 2-7, such as the service layer, service layer device, service layer application, application entity, and the like, may be logical entities that may be implemented in the form of software (i.e., computer-executable instructions) stored in a memory of, and executing on a processor of, an apparatus configured for wireless and/or network communications or a computer system such as those illustrated in FIG. 9C or FIG. 9D. That is, the method(s) illustrated in FIGS. 2-7 may be implemented in the form of software (i.e., computer-executable instructions) stored in a memory of an apparatus, such as the apparatus or computer system illustrated in FIG. 9C or FIG. 9D, which computer executable instructions, when executed by a processor of the apparatus, perform the steps illustrated in FIGS. 2-7. It is also understood that any transmitting and receiving steps illustrated in FIGS. 2-7 may be performed by communication circuitry of the apparatus/entity under control of the processor of the apparatus and the computer-executable instructions (e.g., software) that it executes.

FIG. 9A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or apparatus of the IoT/WoT as well as an IoT/WoT Service Layer, etc. Any of the entities illustrated in any of FIGS. 1-8 may comprise a network apparatus of a communication system, such as the ones illustrated in FIGS. 9A-9D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above-mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 9A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 9A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network apparatuses (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link.

A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Example M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 9B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more network apparatuses of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more network apparatuses of the network, which may comprise servers, computers, devices, virtual machines (e.g., cloud computing/storage farms, etc.) or the like.

Referring also to FIG. 9B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other network apparatuses of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 9B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network apparatus (e.g., server, computer, gateway, device or the like) having the general architecture illustrated in FIG. 9C or FIG. 9D described below.

Further, the methods and functionalities described herein may be implemented as part of an M2M network that uses a Service Oriented Architecture (SOA) and/or a Resource-Oriented Architecture (ROA) to access services.

FIG. 9C is a block diagram of an example hardware/software architecture of an apparatus of a network, such as one of the entities illustrated in FIGS. 1-8, which may operate as an M2M server, gateway, device, or other network apparatus in an M2M network such as that illustrated in FIGS. 9A and 9B. As shown in FIG. 9D, the network apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The network apparatus 30 may also include communication circuitry, such as a transceiver 34 and a transmit/receive element 36. It will be appreciated that the network apparatus 30 may include any sub-combination of the foregoing elements while remaining consistent with an embodiment. This network apparatus may be an apparatus that implements the methods for the adaptive control of service layer operations described herein, such as the methods operations illustrated and described in relation to FIGS. 2-7.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the network apparatus in order to perform the various required functions of the network apparatus. For example, the processor 32 may perform signal coding, data processing, power control, input/output processing, and/or any other functionality that enables the network apparatus 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 9C, the processor 32 is coupled to its communication circuitry (e.g., transceiver 34 and transmit/receive element 36). The processor 32, through the execution of computer executable instructions, may control the communication circuitry in order to cause the network apparatus 30 to communicate with other network apparatuses via the network to which it is connected. In particular, the processor 32 may control the communication circuitry in order to perform the transmitting and receiving steps described herein (e.g., in FIGS. 2-7) and in the claims. While FIG. 9C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other network apparatuses, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 9C as a single element, the network apparatus 30 may include any number of transmit/receive elements 36. More specifically, the network apparatus 30 may employ MIMO technology. Thus, in an embodiment, the network apparatus 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the network apparatus 30 may have multi-mode capabilities. Thus, the transceiver 34 may include multiple transceivers for enabling the network apparatus 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the network apparatus 30, such as on a server or a home computer. The processor 32 may be configured to control lighting patterns, images, or colors on the display or indicators 42 to reflect the status of an apparatus or configure an apparatus, and in particular underlying networks, applications, or other services in communication with the network apparatus. In one embodiment, the display/indicators 42 may present the graphical user interface illustrated in FIG. 9D and described herein.

The processor 32 may receive power from the power source 48, and may be configured to distribute and/or control the power to the other components in the network apparatus 30. The power source 48 may be any suitable device for powering the network apparatus 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the network apparatus 30. It will be appreciated that the network apparatus 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The network apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The network apparatus 30 may connect to other components, modules, or systems of such apparatuses or devices via one or more interconnect interfaces, such as an interconnect interface that may comprise one of the peripherals 52.

FIG. 9C is a block diagram of an example computing system 90 which may also be used to implement one or more network apparatuses of a network, such as the entities illustrated in FIGS. 1-8 and described herein, which may operate as an M2M server, gateway, device, or other network apparatus in an M2M network such as that illustrated in FIGS. 9A and 9B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 9D and its accompanying description.

Further, computing system 90 may contain communication circuitry, such as for example a network adaptor 97, that may be used to connect computing system 90 to an external communications network, such as network 12 of FIG. 9A-9D, to enable the computing system 90 to communicate with other apparatuses of the network. The communication circuitry, alone or in combination with the CPU 91, may be used to perform the transmitting and receiving steps described herein (e.g., in FIGS. 2-7) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service layer technologies that may appear in the above description. Unless otherwise specified, the acronyms used herein refer to the corresponding term listed below:

| | |
|---|---|
| ACP | Access Control Policy |
| AE | Application Entity |
| CSE | Common Services Entity |
| CSF | Common Services Function |
| DM | Device Management |
| GUI | Graphical User Interface |
| IoT | Internet of Things |
| i2RS | Interface to the Routing System |
| MANO | Management and Orchestration |
| MPLS | Multiprotocol Label Switching |
| M2M | Machine-to-Machine |
| NETCONF | Network Configuration Protocol |
| PCEP | Path Computational Element Protocol |
| PoA | Point of Access |
| RL | Resource Levels |
| SL | Service Layer |
| SNMP | Simple Network Management Protocol |

The following is a list of terms and definitions relating to service layer technologies that may appear in the above description. Unless otherwise specified, the terms and definitions used herein refer to the corresponding term listed below:

| Term | Definition |
|---|---|
| Adaptive control | The mechanism in which a Service Layer's operations can be adjusted to account for changing server conditions. Adjustments typically involve suspending or disabling certain services or operations to limit the loading of the Service Layer. It may also involve resuming or enabling services or operations as the Service Layer recovers more server resources. |
| Memory and Storage | Note that we use the term memory and storage somewhat interchangeably in this paper, however, sometimes there can be distinction between the two terms. Storage often refers to memory that is used to store data values and memory can generically refer to storage or memory that is used to store executable code. |
| Server resources | These are physical or virtual resources present in the operations of a Service Layer that usually are associated with hardware. Physical resources may consist of hardware CPU, memory, storage, network connectivity, etc. and virtual resources can be virtual machines or containers and network functions that realizes a Service Layer, for example, in the cloud. |
| Service Layer adaptation | A term used to signify the Service Layer is running in a reduced, functional state from its normal operations. This may be a result of the proposed adaptive control that is activated by one or more SL adaptation rules. |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method implemented in a service layer entity of a communications network, the method comprising:
    activating, at the service layer entity, one or more adaptation rules for modifying one or more characteristics of the service layer entity based on one or more operational metrics of the service layer entity, wherein the operational metrics of the service layer entity comprise one or more service layer metrics;
    receiving, from another entity in communication with the service layer entity, a request to perform an operation at the service layer entity;
    determining, at the service layer entity and based on the one or more adaptation rules, that the operation is not capable of being executed by the service layer entity; and
    transmitting, by the service layer entity, a request for additional resources to be utilized by the service layer entity.

2. The method of claim 1, wherein the service layer metrics comprise one or more of a resource discovery latency, a semantic query latency, a database read latency, a database write latency, a request processing latency, a throughput, an error rate, a number of pending requests, a number of subscription resources, and a notification rate.

3. The method of claim 1, wherein the request for the additional resources comprises at least one of an indication of the type of additional resources needed, how long the additional resources are needed, and a reason for requesting the additional resources.

4. The method of claim 3, wherein the type of the additional resources comprises one or more of additional storage, additional memory, additional processing cycles, lower latency storage and lower latency memory.

5. The method of claim 1, further comprising receiving a response that indicates one or more of whether the additional resources will be provided, when the additional resources will be provided, how long the additional resources will be provided for, and a cost associated with receiving the additional resources.

6. The a method of claim 1, further comprising receiving a response indicating that the service layer entity should move to a different physical platform.

7. The method of claim 1, wherein the request for the additional resources is sent to a management and orchestration system.

8. An apparatus comprising a processor and a memory, the memory storing computer-executable instructions which, when executed by the processor, implement a service layer entity of a communications network and cause the service layer entity to perform operations comprising:
   activating, at the service layer entity, one or more adaptation rules for modifying one or more characteristics of the service layer entity based on one or more operational metrics of the service layer entity, wherein the operational metrics of the service layer entity comprise one or more service layer metrics;
   receiving, from another entity in communication with the service layer entity, a request to perform an operation at the service layer entity;
   determining, at the service layer entity and based on the one or more adaptation rules, that the operation is not capable of being executed by the service layer entity; and
   transmitting, by the service layer entity, a request for additional resources to be utilized by the service layer entity.

9. The apparatus of claim 8, wherein the service layer metrics comprise one or more of a resource discovery latency, a semantic query latency, a database read latency, a database write latency, a request processing latency, a throughput, an error rate, a number of pending requests, a number of subscription resources, and a notification rate.

10. The apparatus of claim 8, wherein the request for the additional resources comprises at least one of an indication of the type of additional resources needed, how long the additional resources are needed, and a reason for requesting the additional resources.

11. The apparatus of claim 10, wherein the type of the additional resources comprises one or more of additional storage, additional memory, additional processing cycles, lower latency storage and lower latency memory.

12. The apparatus of claim 8, wherein the instructions when executed further cause the service layer entity to perform operations comprising receiving a response that indicates one or more of whether the additional resources will be provided, when the additional resources will be provided, how long the additional resources will be provided for, and a cost associated with receiving the additional resources.

13. The apparatus of claim 8, wherein the instructions when executed further cause the service layer entity to perform operations comprising receiving a response indicating that the service layer entity should move to a different physical platform.

14. The apparatus of claim 8, wherein the request for the additional resources is sent to a management and orchestration system.

15. A computer-readable storage medium storing computer-executable instructions which, when executed by a processor, implement a service layer entity of a communications network and cause the service layer entity to perform operations comprising:
   activating, at the service layer entity, one or more adaptation rules for modifying one or more characteristics of the service layer entity based on one or more operational metrics of the service layer entity, wherein the operational metrics of the service layer entity comprise one or more service layer metrics;
   receiving, from another entity in communication with the service layer entity, a request to perform an operation at the service layer entity;
   determining, at the service layer entity and based on the one or more adaptation rules, that the operation is not capable of being executed by the service layer entity; and
   transmitting, by the service layer entity, a request for additional resources to be utilized by the service layer entity.

16. The computer-readable storage medium of claim 15, wherein the service layer metrics comprise one or more of a resource discovery latency, a semantic query latency, a database read latency, a database write latency, a request processing latency, a throughput, an error rate, a number of pending requests, a number of subscription resources, and a notification rate.

17. The computer-readable storage medium of claim 15, wherein the request for the additional resources comprises at least one of an indication of the type of additional resources needed, how long the additional resources are needed, and a reason for requesting the additional resources.

18. The computer-readable storage medium of claim 17, wherein the type of the additional resources comprises one or more of additional storage, additional memory, additional processing cycles, lower latency storage and lower latency memory.

19. The computer-readable storage medium of claim 15, wherein the instructions when executed further cause the service layer entity to perform operations comprising receiving a response that indicates one or more of whether the additional resources will be provided, when the additional resources will be provided, how long the additional resources will be provided for, and a cost associated with receiving the additional resources.

20. The computer-readable storage medium of claim 15, wherein the instructions when executed further cause the service layer entity to perform operations comprising receiving a response indicating that the service layer entity should move to a different physical platform.

* * * * *